US011995677B2

(12) United States Patent
Drummond et al.

(10) Patent No.: US 11,995,677 B2
(45) Date of Patent: *May 28, 2024

(54) AUGMENTED REALITY CONTENT ITEMS TO TRACK USER ACTIVITY AND REDEEM PROMOTIONS

(71) Applicant: Snap Inc., Santa Monica, CA (US)

(72) Inventors: Virginia Drummond, Venice, CA (US); Erika Michele Kehrwald, Venice, CA (US); Jean Luo, Seattle, WA (US); Alek Matthiessen, Marina Del Rey, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,799

(22) Filed: Mar. 31, 2023

(65) Prior Publication Data

US 2023/0237523 A1 Jul. 27, 2023

Related U.S. Application Data

(63) Continuation of application No. 17/248,329, filed on Jan. 20, 2021, now Pat. No. 11,625,743.

(Continued)

(51) Int. Cl.
*G06Q 30/0207* (2023.01)
*G06T 19/00* (2011.01)

(52) U.S. Cl.
CPC ..... *G06Q 30/0222* (2013.01); *G06Q 30/0236* (2013.01); *G06T 19/006* (2013.01)

(58) Field of Classification Search
None
See application file for complete search history.

(56) References Cited

U.S. PATENT DOCUMENTS 10,783,554 B1 * 9/2020 Hylton .............. G06V 20/20
2012/0089449 A1 * 4/2012 Yu .................. G06Q 30/0217
235/375

(Continued)

FOREIGN PATENT DOCUMENTS

CN 116210018 A 6/2023
WO WO-2022067244 A1 3/2022

OTHER PUBLICATIONS

Chehimi et al. ("Augmented Reality 3D Interactive Advertisements on Smartphones," International Conference on the Management of Mobile Business (ICMB 2007)) (Year: 2007).*

(Continued)

*Primary Examiner* — Christopher B Tokarczyk
(74) *Attorney, Agent, or Firm* — Schwegman Lundberg & Woessner, P.A.

(57) ABSTRACT

The amount of user activity performed in relation to a promotion may be tracked based on user content captured via the client application. At least a portion of user content captured via the client application may be scanned and analyzed to identify user activity related to the user content. Augmented reality content items may be executable to generate content that is displayed in relation to the user content and that indicates an amount of user activity related to the promotion. In addition, the augmented reality content items may be executable to generate content in relation to the user content that indicates one or more redemption options for the promotion based on an amount of user activity performed by a user of the client application that captured the user content.

20 Claims, 11 Drawing Sheets

Related U.S. Application Data

(60) Provisional application No. 63/198,086, filed on Sep. 28, 2020.

(56) References Cited

U.S. PATENT DOCUMENTS

| | | | |
|---|---|---|---|
| 2014/0100997 A1* | 4/2014 | Mayerle | G06T 19/006 705/27.2 |
| 2015/0106200 A1 | 4/2015 | Elmekies | |
| 2018/0158087 A1* | 6/2018 | Robinson | G06Q 20/3274 |
| 2018/0315066 A1* | 11/2018 | Heitmueller | G06Q 20/384 |
| 2020/0202390 A1 | 6/2020 | Gregori et al. | |
| 2022/0101361 A1 | 3/2022 | Drummond et al. | |

OTHER PUBLICATIONS

"U.S. Appl. No. 17/248,329, 312 Amendment filed Feb. 16, 2023", 10 pgs.
"U.S. Appl. No. 17/248,329, Final Office Action dated Mar. 23, 2022", 36 pgs.
"U.S. Appl. No. 17/248,329, Non Final Office Action dated Jul. 8, 2022", 38 pgs.
"U.S. Appl. No. 17/248,329, Non Final Office Action dated Dec. 6, 2021", 35 pgs.
"U.S. Appl. No. 17/248,329, Notice of Allowance dated Nov. 16, 2022", 7 pgs.
"U.S. Appl. No. 17/248,329, PTO Response to Rule 312 Communication dated Mar. 13, 2023", 2 pgs.
"U.S. Appl. No. 17/248,329, Response filed Mar. 7, 2022 to Non Final Office Action dated Dec. 6, 2021", 14 pgs.
"U.S. Appl. No. 17/248,329, Response filed Jun. 23, 2022 to Final Office Action dated Mar. 23, 2022", 14 pgs.
"U.S. Appl. No. 17/248,329, Response filed Oct. 11, 2022 to Non Final Office Action dated Jul. 8, 2022", 15 pgs.
"International Application Serial No. PCT/US2021/052379, International Search Report dated Jan. 14, 2022", 4 pgs.
"International Application Serial No. PCT/US2021/052379, Written Opinion dated Jan. 14, 2022", 7 pgs.
Chehimi, et al., "Augmented Reality 3D Interactive Advertisements on Smartphones", International Conference on the Management of Mobile Business (ICMB 2007), (2007).
"International Application Serial No. PCT/US2021/052379, International Preliminary Report on Patentability dated Apr. 6, 2023", 9 pgs.
U.S. Appl. No. 17/248,329 U.S. Pat. No. 11,625,743, filed Jan. 20, 2021, Augmented Reality Content Items to Track User Activity and Redeem Promotions.

* cited by examiner

US 11,995,677 B2

AUGMENTED REALITY CONTENT ITEMS TO TRACK USER ACTIVITY AND REDEEM PROMOTIONS

CLAIM OF PRIORITY

This application is a continuation of U.S. patent application Ser. No. 17/248,329, filed Jan. 20, 2021, which application claims the benefit of priority to U.S. Provisional Application Ser. No. 63/198,086, filed on Sep. 28, 2020, which are incorporated herein by reference in their entirety.

BACKGROUND

Applications executed by client devices may be used to generate content. For example, client applications may be used to generate messaging content, image content, video content, audio content, media overlays, documents, creative works, combinations thereof, and the like. In various situations, client applications may also be used to track purchases of products by users of the client applications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
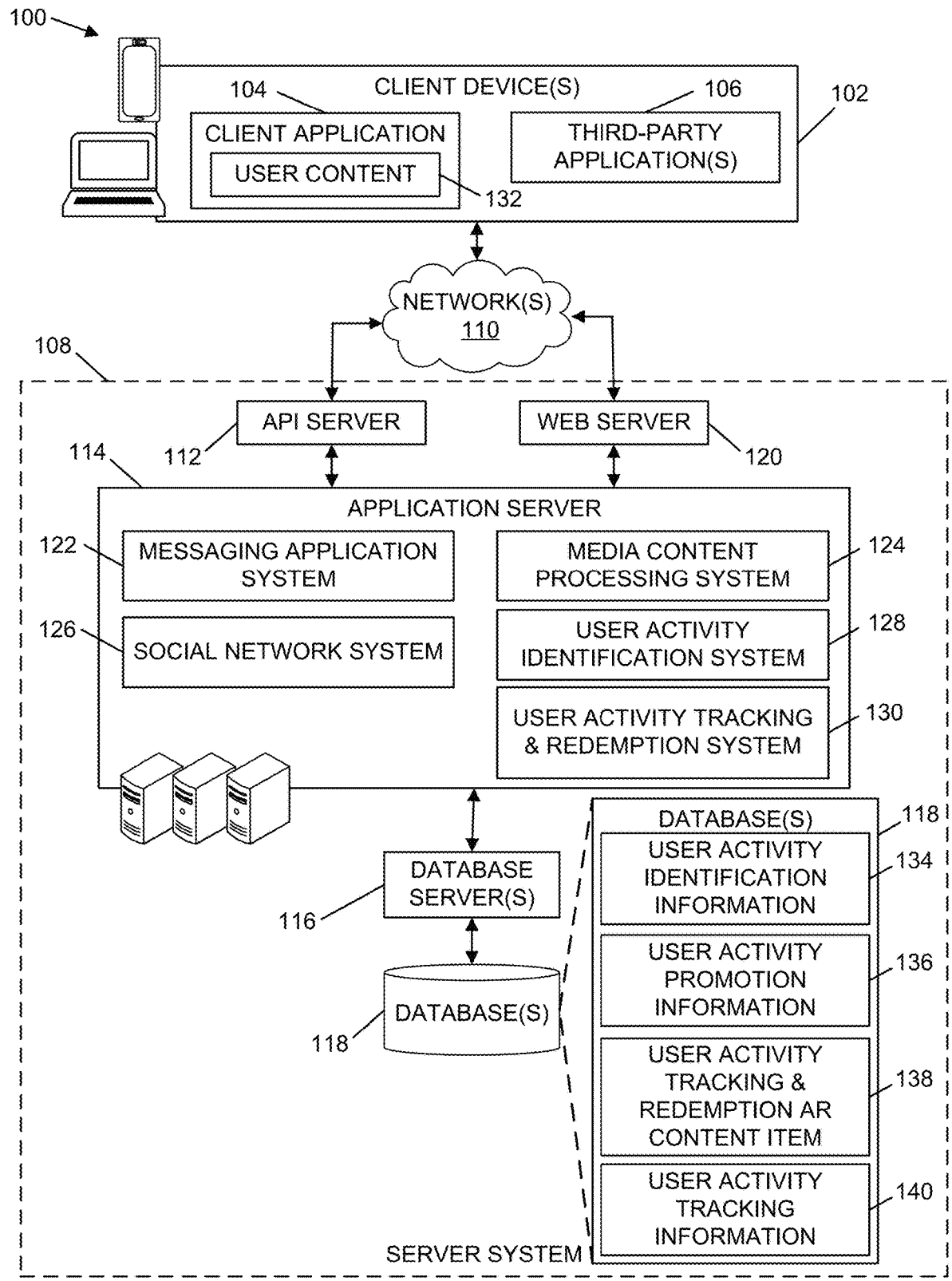
FIG. 1 is a diagrammatic representation of an architecture for exchanging data (e.g., messages and associated content) over a network, according to one or more example implementations.

Augmented reality content items may be used to modify user content that may be produced using a client application. For example, user content may include at least one of video content, image content, or audio content that is captured by one or more input devices of a client device, such as at least one of one or more cameras or one or more microphones. The modified user content may be shared with other users of the client application, such as via messages communicated via the client application or via social networking functionality of the client application. Users of client applications may also purchase items, such as goods or services, via the client applications. For example, client applications may include ecommerce functionality that enables user of the client application to purchase products from sellers of products, such as retailers, wholesalers, direct distributors, manufacturers, and the like.

In existing systems, purchases of items are typically not tracked by social networking client applications or messaging client applications. Rather, purchases of items are tracked using at least one of an account of a user with an ecommerce platform or an account of the user with a respective seller of one or more items. Additionally, existing systems typically do not implement augmented reality content to indicate purchases of products by users of client applications or to redeem promotions related to products based on the number of purchases of the products. Instead, purchases of products are communicated to individuals via messages sent to purchasers of the products or via account information accessible to the purchasers.

Further, existing systems typically do not implement augmented reality content to track visits of users of client applications to locations with regard to promotions associated with the visits to the location. For example, existing systems may obtain geographic position data indicating a location of a user or obtain input indicating a location of a user, such as a check-in. However, existing systems do not implement augmented reality content that tracks visits to locations and that is executable to redeem promotions related to the locations based on the number of visits by a respective user or group of users.

The systems, methods, techniques, instruction sequences, and computing machine program products described herein are directed to augmented reality content items that may be executed to track user activity in relation to promotions offered with respect to at least one of a location or a product. In one or more examples, information identifying a user activity may be scanned via a client application. For example, a camera of a client device may capture image content that includes identification information corresponding to a user activity. The identification information may be analyzed and associated with a respective user activity. The user activity may include a visit to a location by a user of the client application. The user activity may also include a purchase of a product by a user of the client application.

The tracking of the user activity may include aggregating the user activity over a period of time. In one or more examples, tracking user activity may include aggregating a number of visits to a location by a user of the client application over a period of time. In one or more additional examples, tracking user activity may include aggregating a number of purchases of a product by a user of the client application. The user activity may be tracked to determine whether one or more promotions apply to a user of the client application. In various examples, a promotion may include a user of the client application receiving one or more complimentary items based on the activity of the user corresponding to a threshold level of user activity. In one or more illustrative examples, a user of the client application may obtain a complimentary product after visiting a location that offers the product for purchase a threshold number of times. In one or more additional illustrative examples, a user of the client application may obtain a complimentary product after purchasing a threshold number of instances of the product from one or more sellers of the product.

In one or more examples, the user activity may be determined by scanning a portion of a view captured by a camera of a client device. The user content may be displayed in a user interface of the client application. The user interface may include a scanning user interface element that is selectable to scan at least a portion of the user content. In various examples, selection of the scanning user interface element may cause an additional user interface element to be displayed that indicates a portion of the user content that is to be scanned.

The scanned portion of the user content may be analyzed to determine user activity related to the user content. The user activity may also be identified using one or more image processing techniques to determine one or more objects included in user content that may be related to user activity that is to be tracked. The one or more objects may include one or more products that correspond to a promotion related to the one or more products. Additionally, the one or more objects may be used to determine a location that corresponds to a promotion that is related to the location. Further, the scanned portion of the user content may include code information that includes an identifier that corresponds to user activity. For example, the scanned portion of the user content may include at least one of a bar code or a quick response (QR) code.

After identifying user activity related to the user content, one or more promotions related to the user activity may be determined. In situations where a promotion is related to the user activity, the user activity identified by analyzing the user content may be tracked with respect to the promotion. The user activity may also be evaluated with respect to the promotion. In one or more examples, the promotion may indicate that a threshold amount of user activity results in one or more rewards being available to a user of the client application. In these situations, previous instances of the user activity may be combined with one or more current instances of the user activity to produce an aggregated amount of user activity. The aggregated amount of user activity may be analyzed with respect to the threshold amount of user activity corresponding to the promotion related to the user activity. In situations where the aggregated amount of user activity corresponds to the threshold amount of user activity for a promotion, one or more rewards may be made available to the user of the client application.

In one or more examples, augmented reality content items may be executed to display an aggregated amount of user activity with respect to a promotion. The augmented reality content items may be executed to generate at least one of text content, image content, video content, or audio content indicating the aggregated amount of user activity with respect to a promotion. In various examples, the augmented reality content items may be executable to generate an overlay of the user content that indicates an aggregated amount of the user activity with respect to the promotion. In one or more illustrative examples, the augmented reality content items may be executable to cause a punch card to be displayed indicating an amount of user activity in relation to a threshold amount of user activity. To illustrate, the augmented reality content may be executable to generate a punch card that is displayed with respect to the user content and that indicates a number of visits to a location in relation to a threshold number of visits to the location, where the threshold number of visits to the location may trigger a reward for a user of the client application.

The augmented reality content items may also be executable to generate at least one of text content, image content, video content, or audio content that includes an option to redeem or partially redeem one or more instances of user activity with respect to a promotion. In one or more examples, the augmented reality content items may be executable to generate a user interface element that is selectable to at least one of redeem or partially redeem a promotion related to the user activity. In various examples, redemption of at least a portion of the user activity with respect to a promotion may result in a decrease in the aggregated user activity. For example, redemption of user activity with respect to a promotion may reset the aggregated user activity such that an additional threshold amount of the user activity is to be accumulated before an additional redemption of the promotion.

Accordingly, the systems, methods, techniques, instruction sequences, and computing machine program products described herein can execute augmented reality content that may be executable to combine a number of operations related to identifying user activity related to the promotion and redeeming the promotion. For example, the implementations of the augmented reality content items described herein may be executable to cause at least a portion of user content that has been scanned to be analyzed to identify user activity. Executing the augmented reality content items may also cause the user activity to be evaluated with respect to a promotion, to provide information to the user with regard to redemption of the promotion, and to cause one or more options to be accessible to the user to at least one of redeem or partially redeem the user activity with respect to the promotion. By combining a number of operations with regard to tracking user activity and with regard to promotions related to the user activity, the implementations of the augmented reality content items described herein may provide a greater amount of efficiency with respect to tracking user activity and redeeming promotions than existing systems. In particular existing systems and techniques may implement a number of different client applications to separately identify user activity, track the user activity, and to redeem promotions related to the user activity. As a result of generating and executing augmented reality content items that combine operations directed to identifying user activity related to promotions, tracking the user activity, and redemption of promotions associated with the user activity, the systems and techniques described herein minimize the use of computing resources and network resources in relation to the computing resources and network resources utilized by existing systems to perform the same or similar operations.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, a user activity identification system 128, and a user activity tracking and redemption system 130. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The user activity identification system 128 may determine one or more activities that users of the client application 104 are performing. The user activity identification system 128 may analyze user content 132 to determine user activity performed by one or more users of the client application 104. The user content 132 may include at least one of image content, video content, or audio content captured by one or more input devices of a client device 102, such as one or more cameras or one or more microphones of the client device 102. In one or more examples, the user content 132 may include a live camera view captured by one or more cameras of the client device 102. In one or more additional examples, the user content 132 may include content previously captured by one or more input devices of a client device 102. For example, the user content 132 may have been previously captured by one or more input devices of the client device 102 and stored in memory accessible to the client device 102. The memory may be included within a housing of the client device 102 or located remotely with respect to the client device 102. In situations where the memory storing the user content 132 is located remotely with respect to the client device 102, the memory may be accessible to the client device 102 via the one or more networks 110. To illustrate, the user content 132 may be stored in one or more cloud-based storage devices that are accessible to the client device 102 via the one or more networks 110. In one or more illustrative examples, the user content 132 may be stored by the one or more databases 118.

In one or more implementations, the user activity identification system 128 may analyze the user content 132 to identify one or more objects included in the user content 132 that may correspond to user activity identification information 134. In various examples, the user activity identification system 128 may analyze the user content 132 to determine one or more identifiers of user activity included in the user content 132. For example, the user activity identification system 128 may determine that the user content 132 includes at least one of one or more bar codes, one or more QR codes, or one or more alphanumeric identifiers. The user activity identification system 128 may analyze the one or more identifiers of user activity included in the user content 132 with respect to one or more identifiers of user activity stored as the user activity identification information 134. To illustrate, the user activity identification system 128 may determine a measure of similarity between an identifier included in the user content 132 with respect to an identifier of a user activity included in the user activity identification information 134. In one or more examples, the user activity identification system 128 may compare an identifier included in the user content 132 with respect to an identifier of a user activity included in the user activity identification information 134 to determine a measure of similarity between the identifier included in the user content 132 and the identifier of a user activity included in the user activity identification information 134. The user activity identification system 128 may determine that an identifier included in the user content 132 corresponds to an identifier of user activity included in the user activity identification information 134 in response to the measure of similarity being at least a threshold measure of similarity. In one or more illustrative examples, the user activity identification system 128 may determine that the user content 132 includes a QR code and the user activity identification system 128 may determine that the QR code included in the user content 132 corresponds to a QR code included in the user activity identification information 134, where the QR code is related to a respective user activity. In various examples, data related to the user content 132 that is analyzed in relation to the user activity identification information 134 may correspond to a scanned portion of the user content 132. In one or more scenarios, a scanning tool may be executed to scan a portion of the user content 132 and the scanned portion of the user content 132 may be analyzed by the user activity identification system 128 to identify user activity that corresponds to the user content 132.

The user activity identification system 128 may determine one or more objects included in the user content 132 by implementing one or more image processing techniques. For example, the user activity identification system 128 may determine one or more objects included in the user content 132 by implementing object recognition techniques, such as one or more feature-based object recognition techniques or one or more appearance-based object recognition techniques. In one or more illustrative examples, the user activity identification system 128 may implement one or more machine-learning techniques to identify one or more objects included in the user content 132. In various examples, the user activity identification system 128 may implement one or more convolutional neural network-based techniques to identify one or more objects included in the user content 132. In one or more examples, the user activity identification system 128 may analyze at least one of image content, video content, audio content, or text content included in the user content 132 to determine one or more objects included in the user content 132.

In response to identifying one or more objects included in the user content 132 that correspond to one or more objects included in the user activity identification information 134, the user activity identification system 128 may determine one or more user activities that correspond to the user content 132. In one or more examples, one or more objects included in the user content 132 may be analyzed by the user activity identification system 128 to determine a location that corresponds to the user content 132. In various examples, the user activity identification information 134 may include at least one of image content or video content that corresponds to a location and the user activity identification system 128 may perform an analysis of the one or more objects included in the user content 132 in relation to at least one of image content or video content that correspond to one or more locations. Based on the analysis, the user activity identification system 128 may determine a measure of similarity between the one or more objects included in the user content 132 and at least one of image content or video content of one or more locations included in the user activity identification information 134. In situations where the measure of similarity is at least a threshold measure of similarity, the user activity identification system 128 may determine that the user content 132 corresponds to a respective location and that a user activity that corresponds to the user content 132 includes a visit to the respective location. In one or more illustrative examples, the user activity identification system 128 may analyze the user content 132 and determine that the user content 132 corresponds to a coffee shop. In this scenario, the user activity identification system 128 may determine that a user activity related to the user content 132 corresponds to visiting the coffee shop. In one or more additional examples, the user activity identification system 128 may determine that a user activity related to the user content 132 corresponds to a visit to the respective location by a user of the client application 104 based on one or more objects included in the user content 132 corresponding to one or more products available for purchase at the respective location.

In one or more additional examples, the user activity identification system 128 may analyze one or more objects included in the user content 132 in relation to one or more objects included in the user activity identification information 134 that are offered for purchase. In various examples, the user activity identification system 128 may determine a measure of similarity between one or more objects included in the user content 132 in relation to one or more objects offered for purchase that are included in the user activity identification information 134. In one or more illustrative examples, the user activity identification system 128 may determine a measure of similarity between an object included in the user content 132 and an object included in the user activity identification information 134 based on an amount of similarity with respect to at least one of contour characteristics, shape characteristics, or color characteristics between the object included in the user content 132 and the object included in the user activity identification information 134. The user activity identification system 128 may determine that the object included in the user content 132 corresponds to the object included in the user activity identification information 134 in response to determining that the measure of similarity is at least a threshold measure of similarity. In one or more implementations, the user activity identification system 128 may determine a user activity related to the user content 132 based on the one or more objects included in the user content 132 that are identified by the user activity identification system 128. For example, the user activity identification system 128 may determine that a user activity related to the user content 132 corresponds to a purchase of a product that is associated with the one or more objects. In these scenarios, the one or more objects may include at least one of an identifier of the product, such as a name, shape, design, bar code, or QR code, of a physical instance of the product located in a respective location.

The user activity tracking and redemption system 130 may determine one or more promotions related to the user activity that corresponds to the user content 132. In one or more examples, the user activity tracking and redemption system 130 may parse user activity promotion information 136 in relation to a user activity determined by the user activity identification system 128 to determine one or more promotions that correspond to the user activity. For example, the user activity promotion information 136 may indicate at least one of one or more products or one or more locations that correspond to individual promotions of a plurality of promotions. In these scenarios, the user activity tracking and redemption system 130 may analyze at least one of one or more locations or one or more products that correspond to the user content 132 with respect to the user activity promotion information 136 to determine a promotion that is related to the user content 132. In various examples, individual promotions included in the user activity promotion information 136 may be associated with one or more identifiers. The user activity tracking and redemption system 130 may analyze identifiers of at least one of one or more objects or one or more locations that correspond to the user content 132 in relation to identifiers of individual promotions to determine a measure of similarity between one or more identifiers that correspond to the user content 132 and one or more identifiers that correspond to a promotion. In situations where a measure of similarity between an identifier of a promotion included in the user activity promotion information 136 and an identifier of a user activity that corresponds to the user content 132 is at least a threshold measure of similarity, the user activity tracking and redemption system 130 may identify a promotion associated with the user content 132. In various examples, the analysis performed to determine the measure of similarity between a first identifier of a user activity that corresponds to the user content 132 and a second identifier of a promotion included in the user activity promotion information 136 may include comparing the first identifier and the second identifier and determining an amount of matching between the first identifier and the second identifier.

In one or more illustrative examples, the user activity identification system 128 may analyze the user content 132 and determine that a first identifier included in the user content 132 corresponds to a user of the client application 104 visiting a location, such as a coffee shop. In various examples, the first identifier may include a QR code that is accessible to be scanned within the coffee shop. The user activity tracking and redemption system 130 may then analyze the first identifier with respect to a number of additional identifiers included in the user activity promotion information 136 to determine whether the user activity corresponds to a promotion. To illustrate, the user activity tracking and redemption system 130 may compare a QR code related to the coffee shop obtained from the user content with a number of different QR codes that correspond to respective promotions. The user activity tracking and redemption system 130 may then determine a match between the QR code related to the coffee shop and a QR code of a promotion related to the coffee shop. In one or more scenarios, the promotion related to the coffee shop may indicate that users of the client application 104 that visit the coffee shop a threshold number of times receive a complimentary item from the coffee shop.

In one or more additional illustrative examples, the user activity identification system 128 may analyze the user content 132 and determine that an identifier included in the user content 132 corresponds to a product that is available for purchase by a user of the client application 104. In one or more examples, the identifier included in the user content 132 may include at least one of a bar code or a QR code that identifies an instance of a product that is available for purchase by a user of the client application 104. The user activity tracking and redemption system 130 may analyze the identifier included in the user content 132 with respect to a number of additional identifiers included in the user activity promotion information 136 to determine whether a promotion is associated with the product. For example, the user activity tracking and redemption system 130 may compare a bar code or a QR code of a product with a number of bar codes or QR codes included in the user activity promotion information 136. The user activity tracking and redemption system 130 may then determine a match between the bar code or QR code of the product and a bar code or QR code of a promotion related to the product. In one or more instances, the promotion related to the product may indicate that users of the client application 104 that purchase a threshold number of instances of the product may receive a complimentary instance of the product or a complimentary instance of an additional product that is available from a same manufacturer or seller of the product purchased by the user.

In response to determining that an identifier included in the user content 132 corresponds to a promotion, user activity tracking and redemption AR content item 138 may be executed. The user activity tracking and redemption AR content item 138 may be executable to track an amount of the user activity related to the promotion with respect to individual users of the client application 104. For example, each time that an identifier that corresponds to a respective promotion is detected in user content 132 obtained by an individual user of the client application 104, the user activity tracking and redemption AR content 138 may be executable to increment a measure of the user activity related to the promotion with respect to the individual user of the client application 104. The amount of user activity that corresponds to respective promotions by individual users of the client application 104 may be stored as user activity tracking information 140. The user activity tracking information 140 may indicate previous amounts of user activity with respect to one or more promotions by individual users of the client application 104. To illustrate, the user activity tracking information 140 may indicate a number of visits to a location that corresponds to a promotion by individual users of the client application 104. In one or more additional examples, the user activity tracking information 140 may indicate a number of purchases of one or more products that corresponds to a promotion by individual users of the client application 104.

In various examples, after determining that an individual user of the client application 104 has participated in a user activity related to a promotion, the user activity tracking and redemption AR content item 138 may operate in conjunction with the user activity tracking and redemption system 130 to display information indicating an amount of user activity with respect to a promotion. For example, a user interface element corresponding to the user activity tracking and redemption AR content item 138 may be displayed in a user interface that includes the user content 132. In response to selection of the user interface element, the user tracking and redemption AR content 138 may request information about a promotion corresponding to user activity that is related to the user content 132 with respect to a user of the client application 104. In these scenarios, the user activity tracking and redemption system 130 may analyze the user activity tracking information 140 related to the user of the client application 104 and with respect to the promotion to determine an amount of user activity associated with the promotion by the user of the client application 104. The user activity tracking and redemption system 130 may then provide the user activity information to the user activity tracking and redemption AR content item 138. As a result, the user activity tracking and redemption AR content item 138 may be executable to display augmented reality content that indicates the amount of user activity with respect to the promotion for the individual user of the client application 104. In one or more illustrative examples, the user activity tracking and redemption AR content item 138 may be executable to display graphical content that includes at least one of image content or video content indicating the amount of user activity with respect to the promotion. In one or more examples, the user activity tracking and redemption AR content item 138 may be executable to generate a punch card that indicates the amount of user activity with respect to the promotion.

The user activity tracking and redemption AR content item 138 may also be executable to generate graphical content that includes at least one of image content or video content indicating one or more options to redeem at least a portion of the promotion. To illustrate, the user activity tracking and redemption AR content item 138 may be executable to generate augmented reality content that includes a user interface element that is selectable to modify the user activity tracking information 140 related to the promotion that corresponds to the user of the client application 104. For example, selection of a user interface element to redeem at least a portion of a promotion may cause the user activity tracking and redemption system 130 to decrease an amount of user activity included in the user activity tracking information 140 with respect to the user of the client application 104 in relation to the promotion. In one or more examples, the redemption of a promotion with respect to a user of the client application 104 may reset the amount of user activity related to the promotion by the user. In one or more additional examples, the redemption of at least a portion of a promotion may reduce the amount of user activity with respect to the promotion by a specified amount. To illustrate, redemption of 50% of a promotion by a user of the client application 104 may cause the amount of user activity by the user with respect to the promotion to be decreased by 50%.

In various examples, the eligibility of a user of the client application 104 to at least partially redeem a promotion may depend on the amount of user activity by the user with respect to the promotion. In one or more examples, the user of the client application 104 may have to accumulate at least a threshold amount of user activity with respect to the promotion to at least partially redeem the promotion. The user activity tracking and redemption system 130 may determine an amount of user activity with respect to a promotion for a user of the client application 104 and determine whether the amount of user activity corresponds to a threshold amount of user activity eligible for at least partial redemption of a promotion. In situations where the amount of user activity with respect to a promotion corresponds to a threshold amount of user activity, the user activity tracking and redemption system 130 may determine that the user of the client application 104 is eligible for at least partial redemption of the promotion. In one or more implementations, the user activity tracking and redemption AR content item 138 may operate in conjunction with the user activity tracking and redemption system 130 to determine whether the user of the client application 104 is eligible to at least partially redeem the promotion. In scenarios where the user is eligible to at least partially redeem the promotion, the user activity tracking and redemption AR content item 138 may be executable to provide one or more options for the redemption of the promotion based on an amount of user activity with respect to the promotion by the user of the client application 104. In one or more illustrative examples, the user activity tracking and redemption AR content item 138 may be executable to cause information related to at least partial redemption of the promotion that indicates an amount of user activity that may be redeemed in relation to one or more rewards corresponding to the promotion.

In various examples, purchases of products may be confirmed by information obtained from sellers of the products. For example, an identifier, code, or other purchase verification information corresponding to the seller of the product may be provided to the server system 108 in conjunction with the identifier of the product included in the user content 132. Additionally, purchase data related to one or more financial transactions may be obtained from one or more financial services providers to verify a purchase of the product by a user of the client application 104 in relation to a promotion offered to users of the client application 104.

Figure 2:
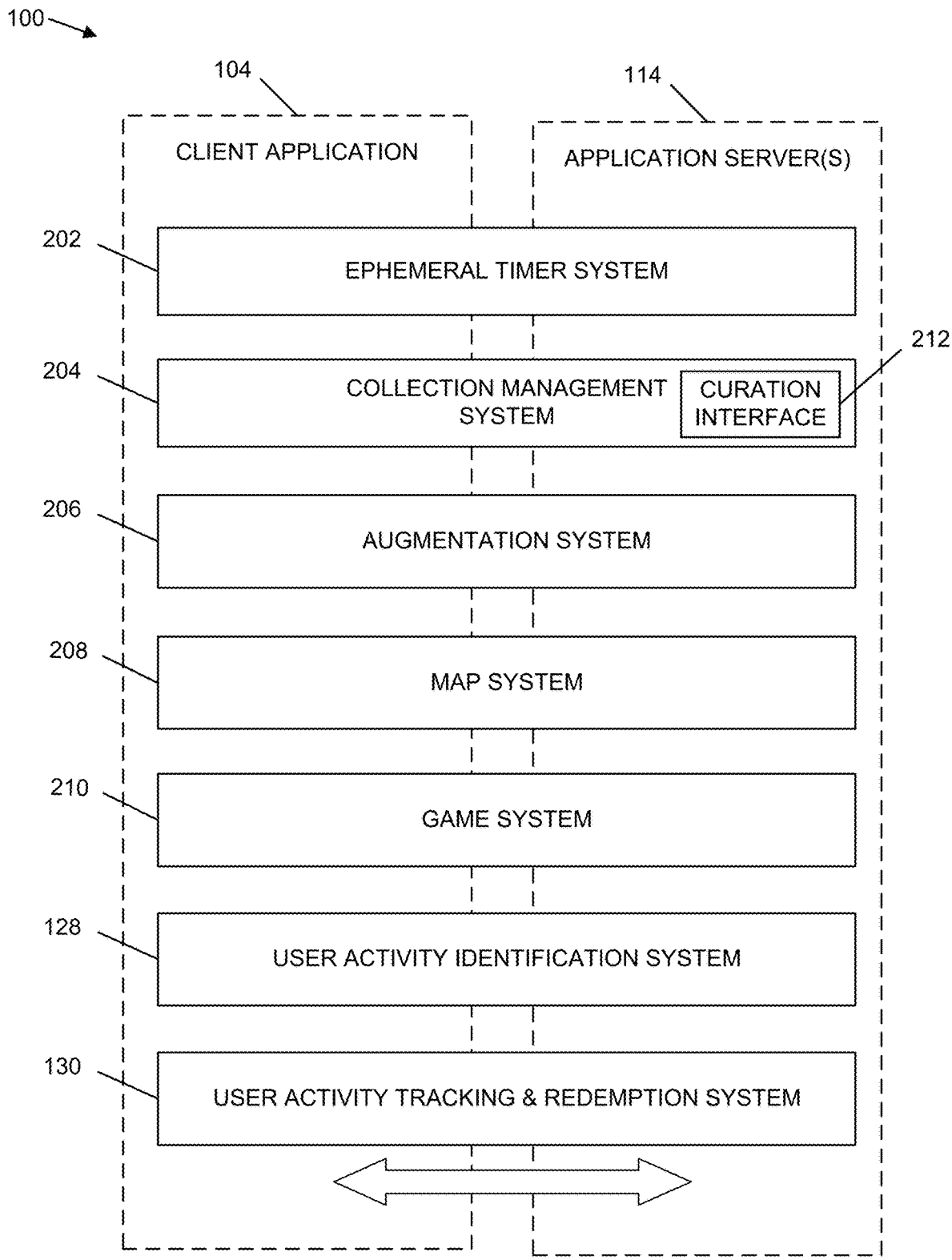
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, the user activity identification system 128, and the user activity tracking and redemption system 130.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The user activity identification system 128 may determine user activity that corresponds to a promotion by analyzing user content obtained via the client application 104. In one or more examples, the user activity identification system 128 may identify user activity based on scanned data that corresponds to the user content. For example, a portion of the user content may be scanned and provided to the user activity identification system 128. The user activity identification system 128 may then analyze the scanned data in relation to stored data that corresponds to user activity. In various examples, the user activity identification system 128 may determine that the scanned data includes an identifier of user activity, such as a QR code or a bar code. In one or more illustrative examples, the QR code or the bar code may be analyzed with respect to a number of QR codes or bar codes related to user activity that corresponds to a number of promotions. In scenarios where the identifiers included in the user content correspond to a promotion, the user activity identification system 128 may operate in conjunction with the user activity tracking and redemption system 130 to track the amount of user activity with respect to the promotion.

The user activity tracking and redemption system 130 may update an amount of user activity by individual users of the client application 104 with respect to one or more promotions. In one or more examples, as the user activity identification system 128 identifies user activity associated with a promotion with respect to a user of the client application 104, the user activity tracking and redemption system 130 may increase the amount of user activity stored by a profile of the user of the client application 104. The user activity tracking and redemption system 130 may also determine when a user of the client application 104 is eligible to redeem at least a portion of the user activity in regard to a promotion. For example, the user activity tracking and redemption system 130 may determine that a user of the client application 104 has performed at least a threshold amount of user activity with respect to the promotion and offer one or more options to redeem the user activity with respect to the promotion. In one or more illustrative examples, the redemption of the user activity with respect to the promotion may result in the user of the client application 104 obtaining one or more rewards related to the promotion, such as one or more complimentary items or discounts.

Figure 3:
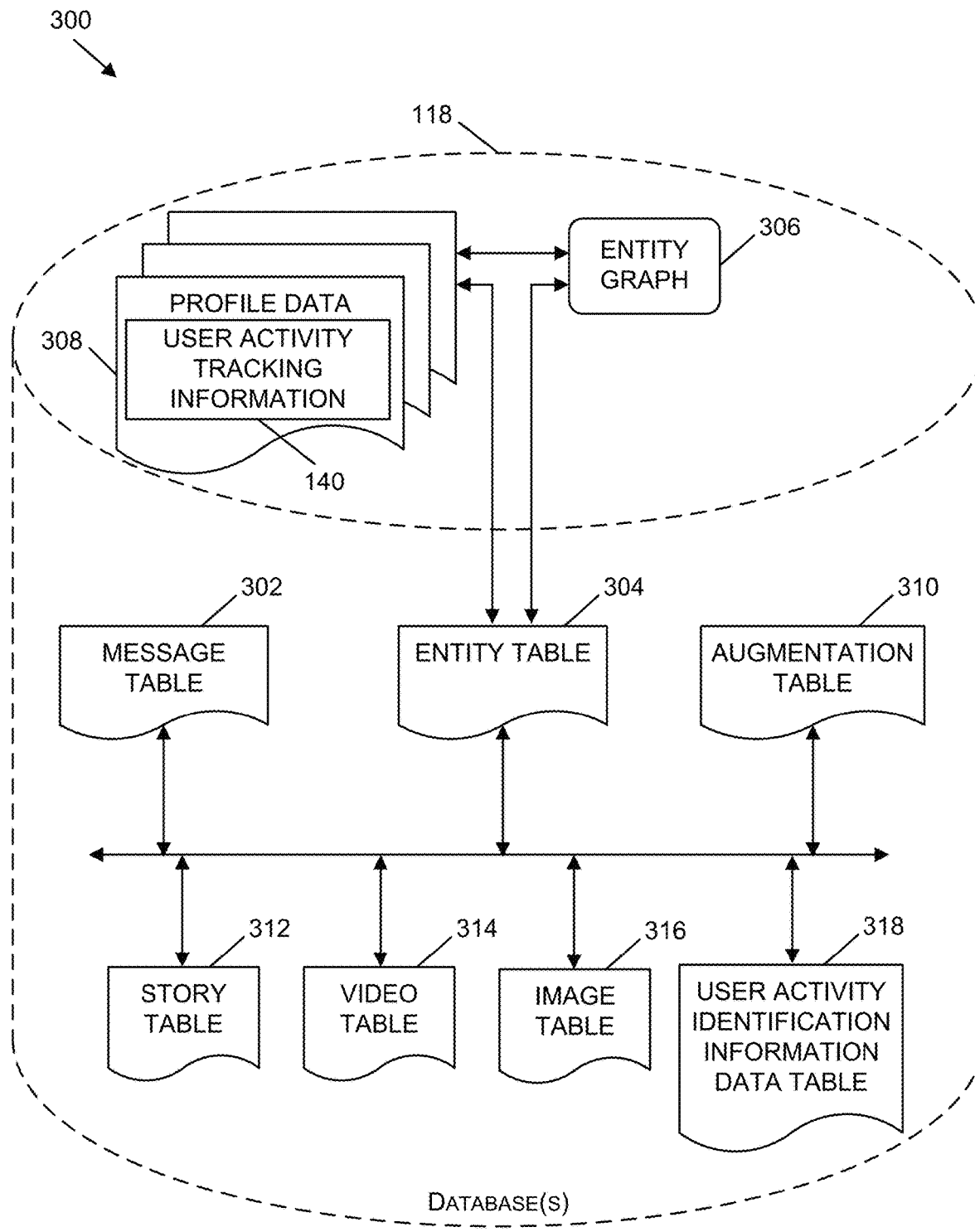
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location.

For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

In one or more examples, the profile data 308 may store user activity tracking information 140 for individual users of the client application 104. The user activity tracking information 140 may indicate an amount of user activity with respect to one or more promotions for individual users of the client application 104. For example, the user activity tracking information 140 may indicate a first amount of user activity with respect to a first promotion for a user of the client application 104. The user activity tracking information 140 may also indicate a second amount of user activity with respect to a second promotion for a user of the client application 104. Additionally, the user activity tracking information 140 for an additional user of the client application 104 may indicate a first additional amount of user activity with respect to the first promotion and a second additional amount of user activity with respect to the second promotion.

The database(s) 118 may also store a user activity identification information data table 318. The user activity identification information data table 318 may store information related to user activity that corresponds to one or more promotions that may be available to users of the client application 104. For example, the user activity identification information data table 318 may store identifiers of user activity related to one or more promotions. To illustrate, the user activity identification information data table 318 may store one or more QR codes that correspond to user activity related to one or more promotions available to users of the client application 104. In one or more additional examples, the user activity identification information data table 318 may store one or more bar codes that correspond to user activity related to one or more promotions available to users of the client application 104. In various examples, the user activity identification information data table 318 may store at least one of a number of bar codes or a number of QR codes of products that are related to a promotion. Additionally, the user activity identification information data table 318 may include at least one of one or more bar codes or one or more QR codes that correspond to one or more locations that may be associated with one or more promotions. The user activity identification information data table 318 may be accessible to the user activity identification system 128 to identify user activity related to user content that corresponds to one or more promotions. In one or more examples, the user activity identification system 128 may analyze information stored by the user activity identification information data table 318 to identify user activity performed by users of the client application 104 based on user content analyzed by the user activity identification system 128.

Figure 4:
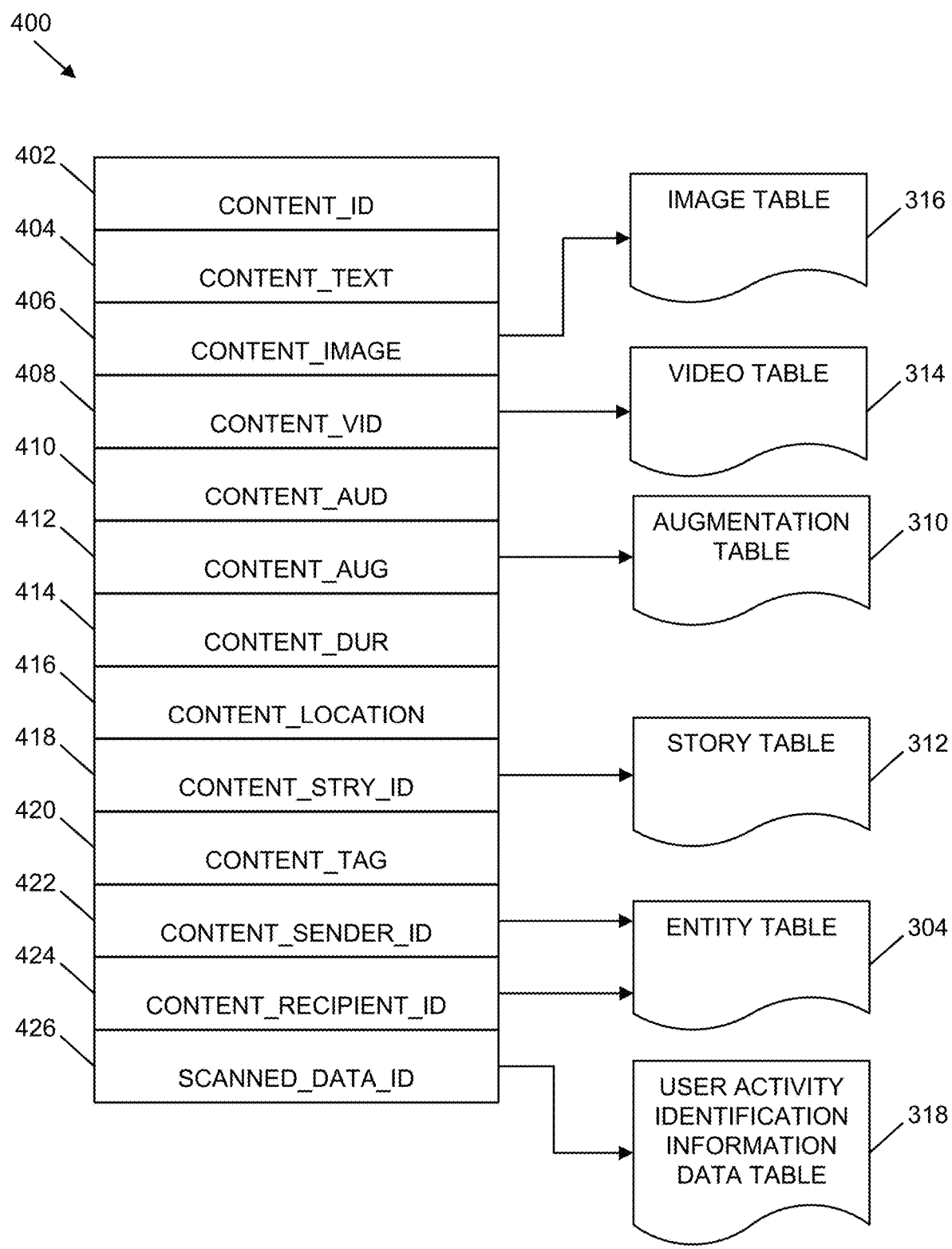
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for sent or received content 400 may be stored in the image table 316.

content video payload 408: video data, captured by a camera component or retrieved from a memory component of the client device 102, and that is included in the content 400. Video data for sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

scanned data identifier 426: an identifier included in user content that has been scanned using functionality of the client application 104. The identifier may correspond to user activity that is related to a promotion offered to users of the client application 104. The scanned data identifier 426 may correspond to a QR code included in a scanned portion of the content 400. In additional examples, the scanned data identifier 426 may correspond to a bar code included in a scanned portion of the content 400.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the scanned data identifier(s) 426 may point to data stored within a data structure that includes the user activity identification information data table 318. The scanned data identifier 426 may be analyzed with respect to identifiers included in the user activity identification information data table 318 to determine whether the scanned data identifier 426 corresponds to a user activity that is related to a promotion offered to users of the client application 104.

Figure 5:
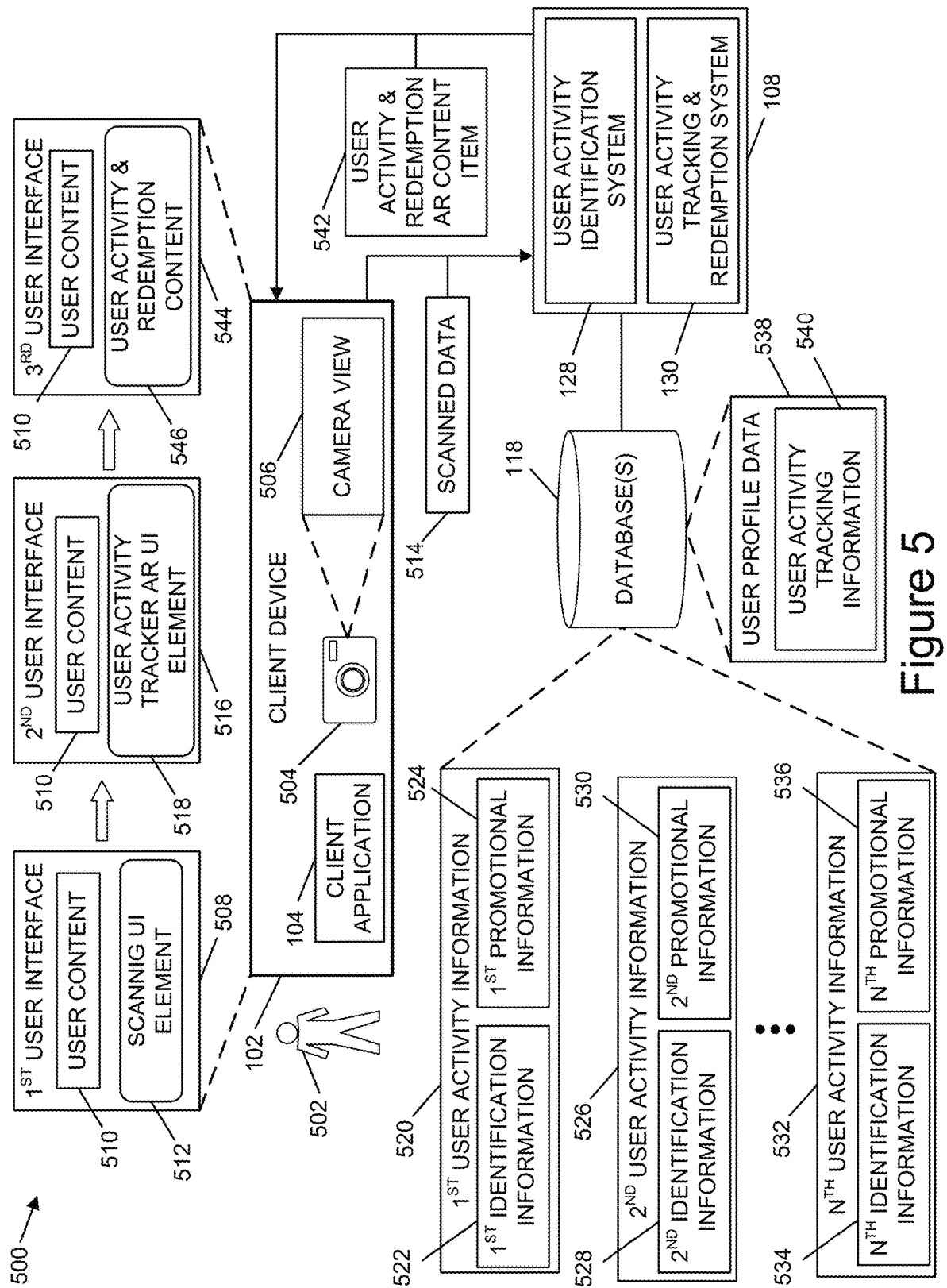
FIG. 5 is a diagrammatic representation illustrating an architecture to generate augmented reality content that track activity of users of a client application and that may be used to redeem promotions offered with respect to the user activity, in accordance with one or more example implementations.

FIG. 5 is a diagrammatic representation illustrating an architecture 500 to generate augmented reality content that tracks activity of users of a client application and that may be used to redeem promotions offered with respect to the user activity, in accordance with one or more example implementations. The architecture 500 may include a client device 102 that is operated by a user 502. The client device 102 may store and execute an instance of the client application 104. The client device 102 may also include one or more cameras, such as camera 504. The camera 504 may capture at least one of image content or video content. The client device 102 may also include one or more input devices that capture audio content that may correspond to video content captured by the camera 504. The camera 504 may capture a camera view 506 that may include a live view of content being captured by the camera 504.

The client application 104 may cause a number of user interfaces to be displayed via one or more display devices of the client device 102. For example, the client application 104 may cause a first user interface 508 to be displayed. The first user interface 508 may include user content 510. The user content 510 may include at least one of image content or video content captured via the camera 504. In one or more examples, the user content 510 may include the camera view 506. In one or more additional examples, the user content 510 may include content previously captured by the camera 504. In various examples, at least a portion of the user content 510 may be stored by memory of the client device 102. In one or more further examples, at least a portion of the user content 510 may be stored in one or more data storage devices that are located remotely with respect to the client device 102 and accessible to the client device 102.

The first user interface 508 may also include a scanning user interface (UI) element 512. The scanning UI element 512 may be selectable to scan a portion of the user content 510 and generate scanned data 514. In one or more examples, the first user interface 508 may include an indicator showing the portion of the user content 510 that is to be scanned. The indicator may be moved in response to input from the user 502 to be placed over a specified portion of the user content 510. In one or more examples, the scanned data 514 may be analyzed to determine whether user activity information is included in the scanned data 514. The scanned data 514 may be analyzed by at least one of the client device 102 or the server system 108. In one or more implementations, the scanned data 514 may be analyzed by the user activity identification system 128. The user activity identification system 128 may be executed using computing resources located at the client device 102, the server system 108, or a combination thereof.

In various examples, the client application 104 may display a second user interface 516 after producing the scanned data 514 or in response to producing the scanned data 514. The second user interface 516 may include the user content 510 and a user activity tracker augmented reality (AR) UI element 518. The user activity tracker AR UI element 518 may be displayed in conjunction with a number of additional user interface elements. In one or more examples, the user activity tracker AR UI element 518 and the additional user interface elements may be selectable to execute one or more augmented reality content items that may generate augmented reality content that is displayed via the client application 104. The user activity tracker AR UI element 518 and the additional user interface elements may be arranged in a carousel user interface arrangement that enables users of the client application 104 to display multiple user interface elements at a time and to horizontally scroll through a number of user interface elements that individually correspond to one or more augmented reality content items. In one or more illustrative examples, the user activity tracker AR UI element 518 may be selectable to cause the scanned data 514 to be analyzed.

In one or more examples, the scanned data 514 may be analyzed to identify one or more objects. In various examples, the user activity identification system 128 may be executable to determine whether identifiers, such as at least one of QR codes or bar codes are present in the scanned data 514. For example, the user activity identification system 128 may have been previously trained or include specific computer-readable instructions to identify one or more types of identifiers in the scanned data 514. In addition, the user activity identification system 128 may implement one or more image processing techniques to identify one or more objects included in the scanned data 514.

The one or more objects included in the scanned data 514 may be analyzed by the user activity identification system 128 with respect to user activity identification information stored by the database(s) 118. For example, the database(s) may store information for a number of user activities that may include information to identify the user activity within user content 510. Additionally, promotional information related to a user activity may be stored by the database(s) 118. In the illustrative example of FIG. 5, the database(s) 118 may store first user activity information 520. The first user activity information 520 may include first identification information 522. The first identification information 522 may include information that may be used by the user activity identification system 128 to identify a first user activity. In one or more examples, the first identification information 522 may indicate one or more objects that may correspond to the first user activity. The one or more objects may include identifiers that correspond to the first user activity. In scenarios where the first user activity is visiting a location, the one or more objects may include at least one identifier of the location that is placed at the location. In situations where the first user activity is purchasing a product, the one or more objects may include at least one identifier of the product. In various examples, the one or more objects may include an identifier for each product offered for purchase as part of the first activity. In one or more additional examples, the one or more objects may include objects found in a location that have been identified based on analyzing at least one of previously captured images or previously captured video of the location. In one or more illustrative examples, the one or more objects may include one or more landmarks, one or more objects of an exterior of a location, one or more objects of an interior of a location, one or more geographic features, or one or more combinations thereof.

The first user activity information 520 may also include first promotional information 524. The first promotional information 524 may indicate features of a promotion offered to users of the client application 104 that corresponds to the first user activity. In one or more examples, the first promotional information 524 may indicate a threshold amount of the first user activity for a user of the client application 104 to redeem at least a portion of the promotion. In addition, the first promotional information 524 may indicate one or more rewards that are related to obtaining a threshold amount of the first user activity. The one or more rewards may correspond to one or more products offered for purchase to users of the client application 104. In various examples, the one or more rewards may correspond to discounts with respect to items available for purchase by users of the client application 104. In further examples, the one or more rewards may correspond to one or more complimentary items available to users of the client application 104. In one or more illustrative examples, the first promotional information 524 may indicate one or more rewards related to products available for purchase by users of the client application 104 in relation to a location that corresponds to the first user activity.

In one or more examples, the first promotional information 524 may indicate a number of thresholds of the first user activity that correspond to at least one of respective rewards for individual threshold levels of the first user activity or respective redemption options for individual threshold levels of the first user activity. To illustrate, the first promotional information 524 may indicate a first threshold level of the first user activity that corresponds to partial redemption of the promotion related to the first user activity and a second threshold level of the first user activity that corresponds to full redemption of the promotion related to the first user activity. In one or more illustrative examples, the first promotional information 524 may indicate a first reward with respect to a first threshold level of the first user activity and a second reward with respect to a second threshold level of the first user activity.

The database(s) 118 may also store second user activity information 526 that corresponds to a second user activity. The second user activity information 526 may include second identification information 528 that may be analyzed by the user activity identification system 128 with respect to user content to identify the second user activity. In various examples, the second identification information 528 may indicate one or more objects that correspond to the second user activity. Additionally, the second user activity information 526 may include second promotional information 530.

The second promotional information 530 may indicate one or more features of a promotion related to the second user activity, such as a threshold amount of the second user activity that corresponds to at least partial redemption of the promotion related to the second user activity. Further, the second promotional information 530 may indicate one or more rewards that corresponds to the promotion related to the second user activity.

In one or more additional examples, the database(s) 118 may store up to Nth user activity information 532 that corresponds to an Nth user activity. The Nth user activity information 532 may include Nth identification information 534 that may be analyzed by the user activity identification system 128 with respect to user content to identify the Nth user activity. In one or more examples, the Nth identification information 534 may indicate one or more objects that correspond to the Nth user activity. Further, the Nth user activity information 532 may include Nth promotional information 536. The Nth promotional information 536 may indicate one or more features of a promotion related to the Nth user activity, such as a threshold amount of the Nth user activity that corresponds to at least partial redemption of the promotion related to the Nth user activity. Further, the Nth promotional information 536 may indicate one or more rewards that correspond to the promotion related to the Nth user activity.

In one or more illustrative examples, the user activity identification system 128 may analyze the scanned data 514 with respect to at least one of the first identification information 522, the second identification information 528, or the Nth identification information 534. In one or more examples, the user activity identification system 128 may analyze one or more objects included in the scanned data 514 with respect to one or more objects included in the first identification information 522 to determine a first measure of similarity between the one or more objects included in the scanned data 514 and the one or more objects included in the first identification information 522. In various examples, the user activity identification system 128 may analyze the one or more objects included in the scanned data 514 with respect to one or more objects included in the second identification information 528 to determine a second measure of similarity between the one or more objects included in the scanned data 514 and the one or more objects included in the second identification information 528. Further, the user activity identification system 128 may analyze the one or more objects included in the scanned data 514 with respect to one or more objects included in the Nth identification information 534 to determine a third measure of similarity between the one or more objects included in the scanned data and the one or more objects included in the Nth identification information 534.

The user activity identification system 128 may analyze the first measure of similarity, the second measure of similarity, and the third measure of similarity with respect to a threshold measure of similarity. The user activity identification system 128 may determine that the scanned data 514 corresponds to a user activity based on identifying a measure of similarity that is at least the threshold measure of similarity. In one or more examples, the user activity identification system 128 may implement one or more rules to determine a user activity that corresponds to the scanned data 514. In one or more illustrative examples, the user activity identification system 128 may implement a progression of analyzing the one or more objects included in the scanned data 514 with respect to one or more objects included in respective user activity identification information 520, 526, 532 until a measure of similarity that is at least the threshold measure of similarity is identified. In various examples, the user activity identification system 128 may determine that the first measure of similarity is at least the threshold measure of similarity and then determine that the scanned data 514 corresponds to the first user activity.

After determining a user activity that corresponds to the scanned data 514, the user activity tracking and redemption system 130 may determine a promotion that is applicable with respect to the user 502. For example, the user activity identification system 128 may determine that a promotion corresponding to the first user activity is applicable to the user 502. For example, the user activity identification system 128 may determine that the scanned data 514 corresponds to the first user activity related to the first user activity information 520. In these situations, the user activity tracking and redemption system 130 may analyze user profile data 538 for the user 502 to determine whether the user 502 is participating in the promotion related to the first user activity. In one or more examples, the user profile data 538 may include an indicator or identifier that indicates the user 502 is participating in the promotion. In instances where the user 502 is not participating in the promotion related to the first user activity, the user tracking and redemption system 130 may provide an offer for the user 502 to participate in the promotion. In scenarios where the user 502 is participating in the promotion related to the first user activity, the user profile data 538 may include user activity tracking information 540 that indicates an amount of the first user activity performed by the user 502 with respect to the promotion. Based on the amount of the first user activity, the user activity tracking and redemption system 130 may determine one or more redemption options for the user 502 with respect to the promotion in accordance with the first promotional information 524. In various examples, the user activity tracking and redemption system 130 may determine that the user 502 is eligible for at least partial redemption of the promotion related to the first user activity.

The user activity tracking and redemption system 130 may also update the user activity tracking information 540. To illustrate, in scenarios where the scanned data 514 corresponds to the first user activity, the user activity tracking and redemption system 130 may increase the amount of the first user activity indicated by the user activity tracking information 540 to produce an aggregate amount of the first user activity. In situations where a promotion is at least partially redeemed, the user activity tracking and redemption system 130 may decrease the amount of the user activity with respect to the promotion that was redeemed.

The user activity tracking and redemption system 130 may generate user activity and redemption AR content item 542 that is executable to display information related to a promotion that corresponds to the user content 510. For example, the user activity and redemption AR content item 542 may be executable to display graphical content that includes at least one of image content, video content, or animation content indicating an amount of user activity with respect to the promotion. In various examples, the user activity and redemption AR content item 542 may be executable to display graphical content indicating one or more redemption options related to the promotion. The user activity and redemption AR content item 542 may also cause audio to be produced via one or more output devices of a client device 102. In one or more examples, the user activity tracking and redemption system 130 may generate the user activity and redemption AR content item 542 based on information obtained from user activity information related to the promotion and the user profile data 538 corresponding to the user 502 with respect to the promotion. In one or more illustrative examples where the promotion is related to the first user activity, the user activity tracking and redemption system 130 may generate the user activity and redemption AR content item 542 based on information included in the user activity tracking information 540 for the user 502 with respect to the first promotion and in relation to the first promotional information 524 that indicates redemption information for the first promotion.

In one or more examples, after receiving the user activity and redemption AR content item 542, the client application 104 may generate a third user interface 544. The third user interface 544 may include the user content 510 and user activity and redemption content 546. The user activity and redemption content 546 may be displayed as a result of execution of the user activity and redemption AR content item 542. For example, the user activity and redemption AR content item 542 may be executable to cause the user activity and redemption content 546 to be displayed within the third user interface 544. In various examples, the user activity and redemption content 546 may indicate an amount of user activity by the user 502 with respect to a promotion. In one or more additional examples, the user activity and redemption content 546 may indicate one or more redemption options for the user 502 with respect to the promotion. In one or more scenarios where the user content 510 corresponds to the first user activity, the user activity and redemption content 546 may include an amount of the first user activity performed by the user 502. In addition, the user activity and redemption content 546 may include one or more redemption options with respect to a promotion related to the first user activity.

In one or more illustrative examples, the user content 510 may be analyzed to determine that the user activity performed by the user 502 corresponds to a visit to an ice cream shop. To illustrate, the user content 510 may include at least one of a QR code or a bar code that is located in the ice cream shop that may be scanned by the user 502 via the client application 104. In one or more additional examples, the user content 510 may include a scene from an interior of the ice cream shop and the user activity identification system 128 may determine that the user content 510 corresponds to the ice cream shop by analyzing the user content 510 with respect to previously captured image content or video content of the interior of the ice cream shop.

Continuing with the ice cream shop example from above, the user activity and redemption content 546 may indicate a number of visits by the user 502 to the ice cream shop. Additionally, the user activity and redemption content 546 may indicate a number of visits to the ice cream shop that correspond to one or more redemption options for one or more promotions related to the ice cream shop. For example, the user activity and redemption content 546 may include a first redemption option indicating that after 5 visits to the ice cream shop, a 50% discount may be applied to a purchase of one or more ice cream products and a second redemption option indicating that after 10 visits to the ice cream, a complimentary ice cream product having a value of $10 or less may be provided to the user 502. Based on the number of visits to the ice cream shop by the user 502, the user activity and redemption content 546 may indicate that at least one of the first redemption option or the second redemption option is available to the user 502. In response to selection of a redemption option included in the user activity and redemption content 546, a redemption code may be provided to the client device 102 or to a computing device of the ice cream shop to apply the first redemption option or the second redemption option to a purchase by the user 502 at the ice cream shop. Further, selection of a redemption option may cause the user activity tracking and redemption system 130 to decrease the amount of the user activity with respect to the promotion. In one or more illustrative examples, the user activity tracking information 540 may indicate that the user 502 has performed 11 visits to the ice cream shop. In these scenarios, selection of the second redemption option may result in the user activity tracking and redemption system 130 decreasing the amount of user activity related to the ice cream shop promotion stored in the user activity tracking information 540 from 11 visits to the ice cream shop to one visit to the ice cream shop.

Figure 6:
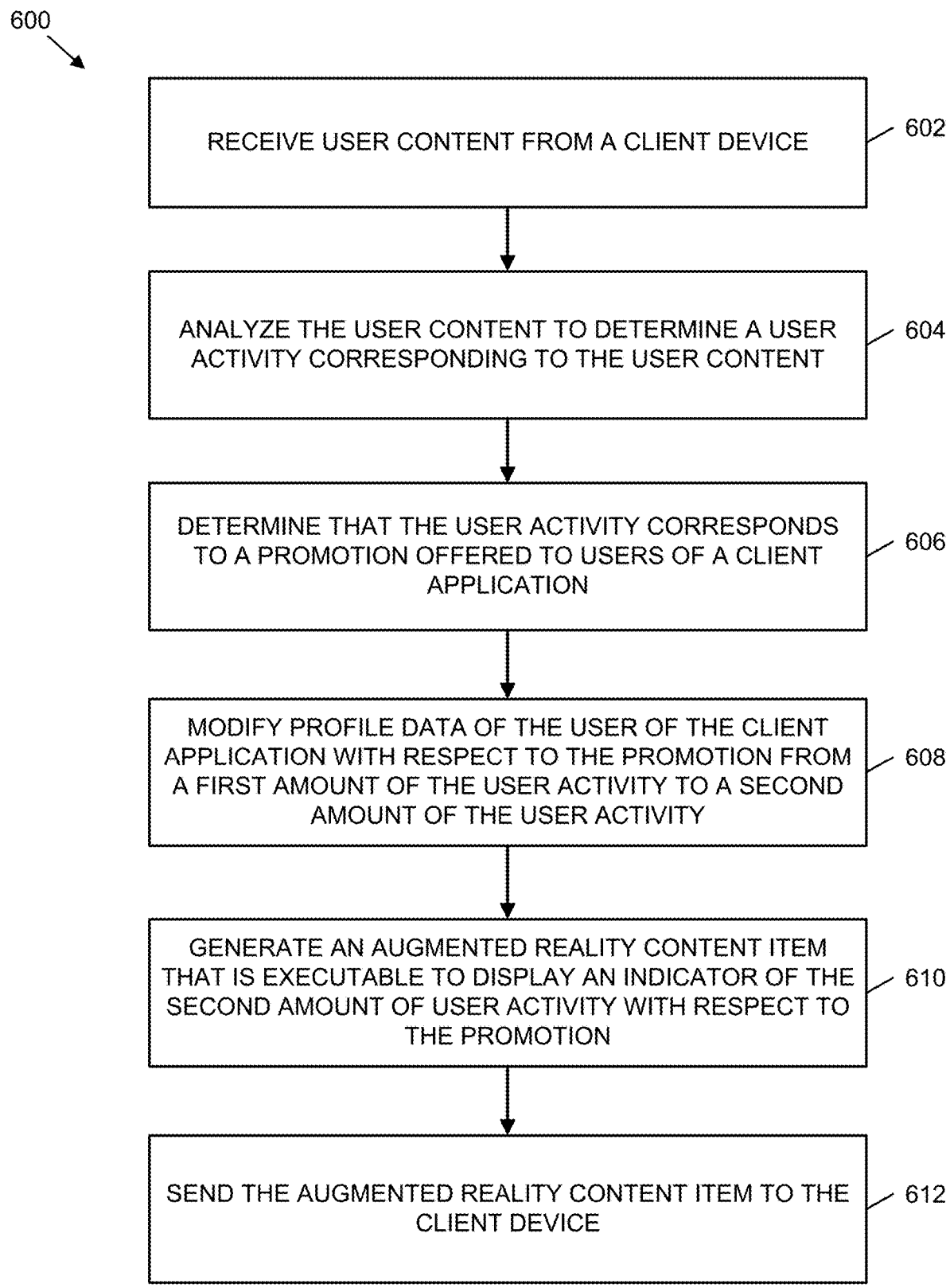
FIG. 6 is a flowchart illustrating example operations of a process to generate augmented reality content that indicates activity of a user of a client application with respect to a promotion, according to one or more example implementations.
Figure 7:
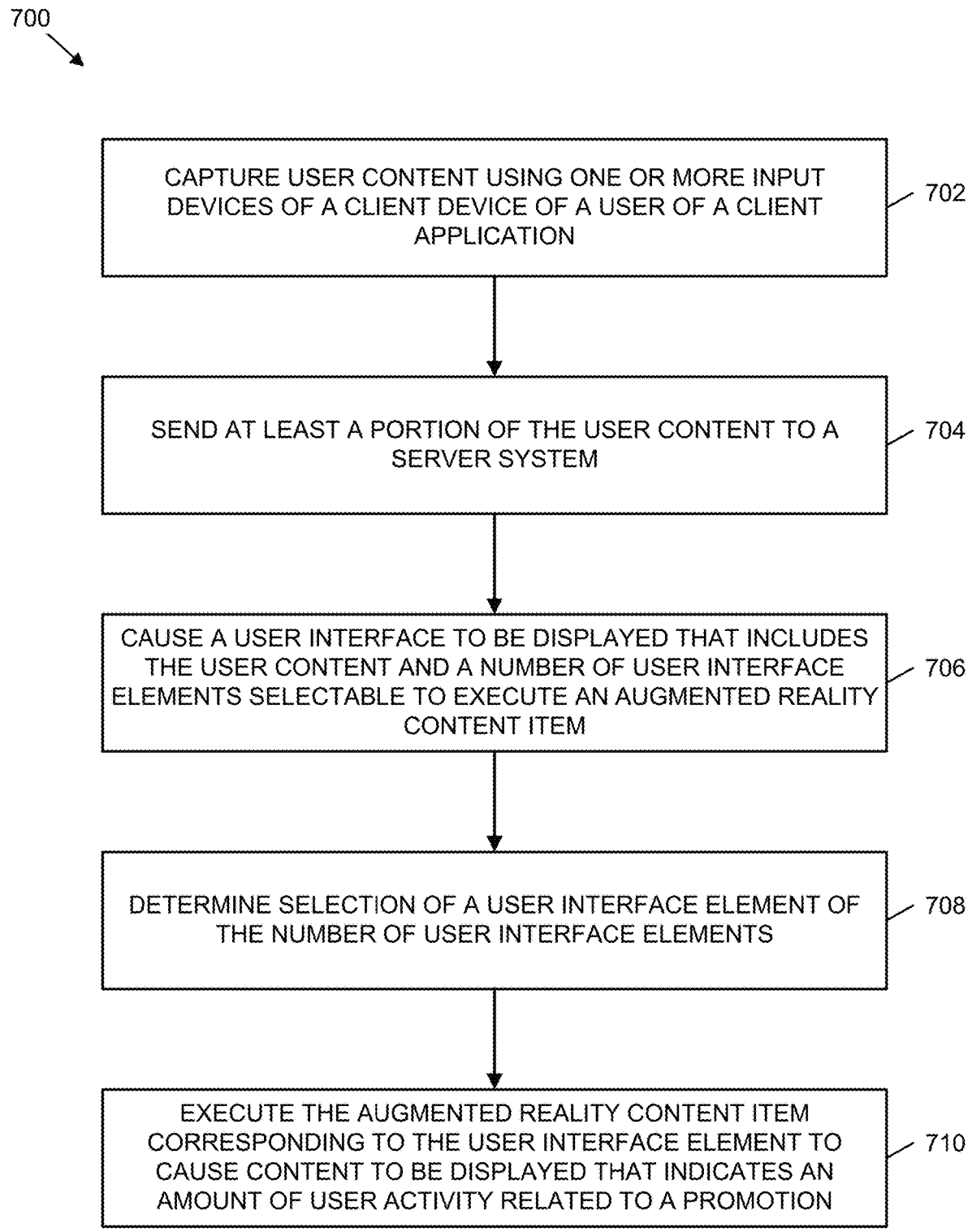
FIG. 7 is a flowchart illustrating example operations of a process to execute augmented reality content that indicates activity of a user of a client application with respect to a promotion, according to one or more example implementations.

FIGS. 6 and 7 illustrate flowcharts of processes to generate and apply augmented reality content items that indicates user activity with respect to a promotion. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to generate augmented reality content items that indicate activity of a user of a client application with respect to a promotion, according to one or more example implementations. At operation 602, the process 600 includes receiving user content from a client device. The user content may be displayed in a user interface of the client application via a display device of the client device. In addition, the user content may include at least one of image content, video content, audio content, or text content. In various examples, the user content may be captured by one or more input devices of a client device executing an instance of the client application. In one or more illustrative examples, the user content may include a live view captured by at least one camera of the client device. The user content may be captured in relation to an account of a user of the client device with respect to a service provider that produces, maintains, and administers the client application.

Additionally, at operation 604, the process 600 may include analyzing the user content to determine a user activity corresponding to the user content. For example, the user content may be analyzed to identify one or more identifiers included in the user content that correspond to the user activity. In one or more examples, the user content may include code information that corresponds to at least one of a QR code or a bar code that corresponds to the user activity. In these scenarios, the QR code or bar code may be scanned by the user of the client application. The QR code or bar code may then be analyzed with respect to a data structure that includes a number of QR codes or bar codes that correspond to respective user activities. In response to determining at least a threshold measure of similarity between the scanned QR code or bar code and a QR code or bar code stored in the data structure, the user activity can be associated with the user content. In one or more further examples, the user activity may include purchasing a product from a merchant, and a QR code or bar code included in the user content may indicate the product purchased by the user.

In various examples, the user activity may also be determined by analyzing objects included in the user content, contours of the user content, shapes of the user content, colors of the user content, text included in the user content, or one or more combinations thereof. To illustrate, the user content may include a scene from a location and the scene may be analyzed using one or more image processing techniques to determine a measure of similarity with respect to scenes stored in one or more data structures that correspond to respective locations. In one or more examples, the user activity may be identified when the measure of similarity between a scene included in the user content and a previously captured scene is at least a threshold measure of similarity. In these situations, the user activity may correspond to a visit to the location.

The process 600 may also include, at operation 606, determining that the user activity corresponds to a promotion offered to users of the client application. In one or more examples, eligibility for the user with respect to the promotion may be determined according to one or more eligibility criteria. In one or more additional examples, an identifier included in the user content may be analyzed with respect to a number of additional identifiers that each correspond with at least one promotion. That is, each promotion offered to users of the client application may be associated with one or more user activities and the user activity related to the user content may be analyzed with respect to the user activities associated with promotions offered to users of the client application.

At 608, the process 600 may include modifying profile data of the user of the client application with respect to the promotion from a first amount of the user activity to a second amount of the user activity. In various examples, the amount of the user activity with respect to the promotion may be tracked with respect to an account of the user related to the client application. In response to determining that the user has performed the user activity, the account of the user may be updated to indicate that the amount of the user activity performed by the user has increased. In one or more examples, the amount of the user activity performed by the user may indicate an eligibility of the user for one or more redemption options with respect to the promotion. For example, one or more redemption options may be triggered in response to a threshold amount of the user activity by the user of the client application. In these situations, the profile data of the user may be analyzed to determine the eligibility of the user with respect to one or more promotions related to the user activity.

Further, the process 600 may include, at operation 610, generating an augmented reality content item that is executable to display an indicator of the second amount of user activity with respect to the promotion, and, at operation 612, the process may include sending the augmented reality content item to the client device. In one or more examples, the augmented reality content item may be executable to cause at least one of image content, video content, text content, or audio content to be output via one or more output devices of the client device. In various examples, the augmented reality content item may be executable to display content that includes one or more graphics indicating a current amount of the user activity performed by the user of the client application with respect to the promotion. In various examples, the graphics may be static and in additional examples, the graphics may be dynamic, such as one or more animations. In one or more illustrative examples, the augmented reality content item may be executable to display one or more graphics related to the amount of the user activity performed by the user of the client application in relation to the promotion within a user interface that includes the user content. For example, the one or more graphics related to the amount of the user activity performed by the user of the client application with respect to the promotion may be displayed as one or more overlays of the user content.

In one or more implementations, the augmented reality content item may also be executable to display content that indicates one or more redemption options with respect to the promotion. To illustrate, the augmented reality content item may be executable to display the second amount of the user activity in relation to one or more threshold amounts of user activity that correspond to respective redemption options with respect to the promotion. In one or more illustrative examples, the one or more redemption options may be displayed in conjunction with the user content, such as graphical content overlaying the user content. In one or more examples, the augmented reality content item may be executable to display an amount of user activity that is used to redeem at least a portion of the promotion and a reward that is associated with the corresponding redemption option. In various examples, the augmented reality content item may be executable to display one or more user interface elements that are selectable to redeem at least a portion of the user activity with respect to the promotion. The one or more user interface elements may be selectable to generate a code that is applicable to provide a discount with respect to one or more items related to the promotion. In one or more additional examples, the one or more user interface elements may be selectable to initiate a transaction to obtain one or more items related to the promotion.

FIG. 7 is a flowchart illustrating example operations of a process 700 to execute augmented reality contents that indicate activity of a user of a client application with respect to a promotion, according to one or more example implementations. The process 700 may include, at operation 702, capturing user content using one or more input devices of a client device of a user of a client application. In one or more examples, the user content may be captured using at least one of one or more cameras or one or more microphones of the client device. In various examples, the user content may include a live view from at least one camera of the client device.

The process 700 may also include, at operation 704, sending at least a portion of the user content to a server system. In one or more examples, the client application may display a user interface to scan a portion of the user content. In these scenarios, the client application may capture a portion of the user content as scanned data and send the scanned data to the server system. The server system may be part of a service provider that produces, maintains, and administers the client application. In various examples, the server system may analyze the user content to identify one or more user activities related to the user content and to determine one or more promotions that are applicable to the one or more user activities.

At operation 706, the process 700 may include causing a user interface to be displayed that includes the user content and a number of user interface elements that are selectable to execute augmented reality content. To illustrate, the user interface elements may be individually selectable to execute an augmented reality content item, with each augmented reality content having different functionality. In various examples, the user interface elements may be arranged in a carousel that enables users to scroll through a set of user interface elements related to augmented reality content and display a subset of the user interface elements at a given time. Additionally, at 708, the process 700 may include determining selection of a user interface element of a number of user interface elements. The user interface element may correspond to augmented reality content that is related to one or more promotions in which the user is participating. The selection of the user interface element may be detected by one or more input devices of the client device, such as a touchscreen or a microphone.

Further, at operation 710, the process 700 may include executing an augmented reality content item corresponding to the user interface element to cause content to be displayed that indicates an amount of user activity related to a promotion. The client application may obtain information from the server system that indicates an amount of user activity related to the user content that corresponds to the promotion. The client application may also obtain information from the server system that indicates one or more redemption options with respect to the promotion based on the amount of user activity performed by the user of the client application. The augmented reality content may be executable to display at least one of image content, video content, or animation content that indicates the amount of user activity performed by the user with respect to the promotion. The augmented reality content may also be executable display additional image content or additional video content indicating one or more redemption options that are applicable to the user of the client application with respect to the promotion. The content generated by the augmented reality content may be displayed in a further user interface that includes the user content.

In various examples, the client application may determine selection of an additional user interface element that corresponds to a redemption option. In one or more examples, the client device may receive a redemption code for the redemption option in response to the selection of the additional user interface element. In one or more additional examples, the redemption code may be applicable in relation to a financial transaction that is related to purchasing one or more products related to the promotion. The redemption code may be provided to a merchant that is offering the one or more products for purchase. For example, the redemption code may be displayed in a user interface and scanned by the merchant or the redemption code may be transmitted electronically to a computing device of the merchant. In further examples, a purchase of a product related to the promotion using the redemption code may be performed using ecommerce functionality of the client application. In these scenarios, the client device may generate financial transaction information that is applicable to one or more purchases of a product related to the promotion using the redemption code.

Figure 8:
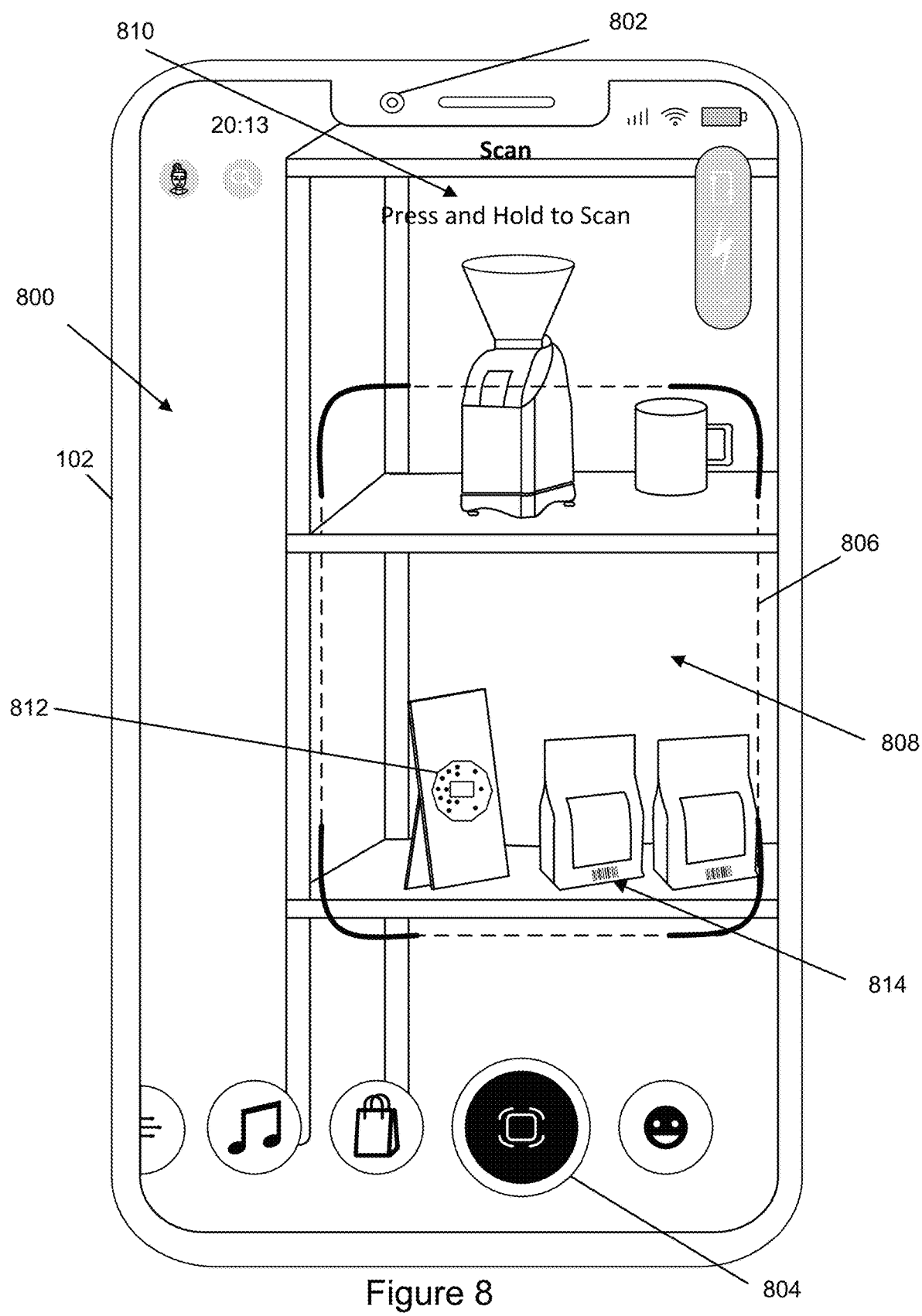
FIG. 8 is an illustration of a user interface that includes a user interface element to scan at least a portion of user content to identify user activity related to the user content, according to one or more example implementations.

FIG. 8 is an illustration of a user interface 800 that includes a user interface element to scan at least a portion of user content to identify user activity related to the user content, according to one or more example implementations. The user interface 800 may be displayed via a display device of the client device 102. In addition, the user interface 800 may be displayed by a client application, such as the client application 104, that includes at least one of messaging functionality or social networking functionality. In one or more examples, the user interface 800 may include user content that is captured within a field of view of at least one camera 802 of the client device 102.

In various examples, the user interface 800 may include a user interface element 804 that is selectable to scan a portion of the user content included in the user interface 800. For example, selection of the user interface element 804 may cause an additional user interface element 806 to be displayed within the user interface 800 that indicates a region 808 that is to be scanned. In one or more examples, the region 808 may be modified by moving the additional user interface element 806 to a different portion of the user interface 800. The user interface 800 may also include text content 810 that includes instructions directed to performing the scanning operation with respect to the region 808.

In one or more implementations, the region 808 may be scanned to identify one or more identifiers of user activity related to a promotion offered to users of the client application 104. In the illustrative example of FIG. 8, the region 808 may include a first identifier 812 and a second identifier 814. The first identifier 812 may indicate a location. For example, the first identifier 812 may include a QR code that indicates a location that is shown within the user interface 800. In these scenarios, the first identifier 812 may indicate a user activity that corresponds to a user of the client application 104 visiting the location. In addition, the second identifier 814 may include a bar code. The bar code may correspond to a product that is related to a promotion offered to users of the client application 104. In these situations, the second identifier 814 may indicate a user activity that corresponds to a user of the client application 104 purchasing one or more products related to the second identifier 814. In various examples where the user activity is directed to the purchase of one or more products, the purchase of the one or more products may be verified by a merchant that is offering the one or more products for purchase.

Figure 9:
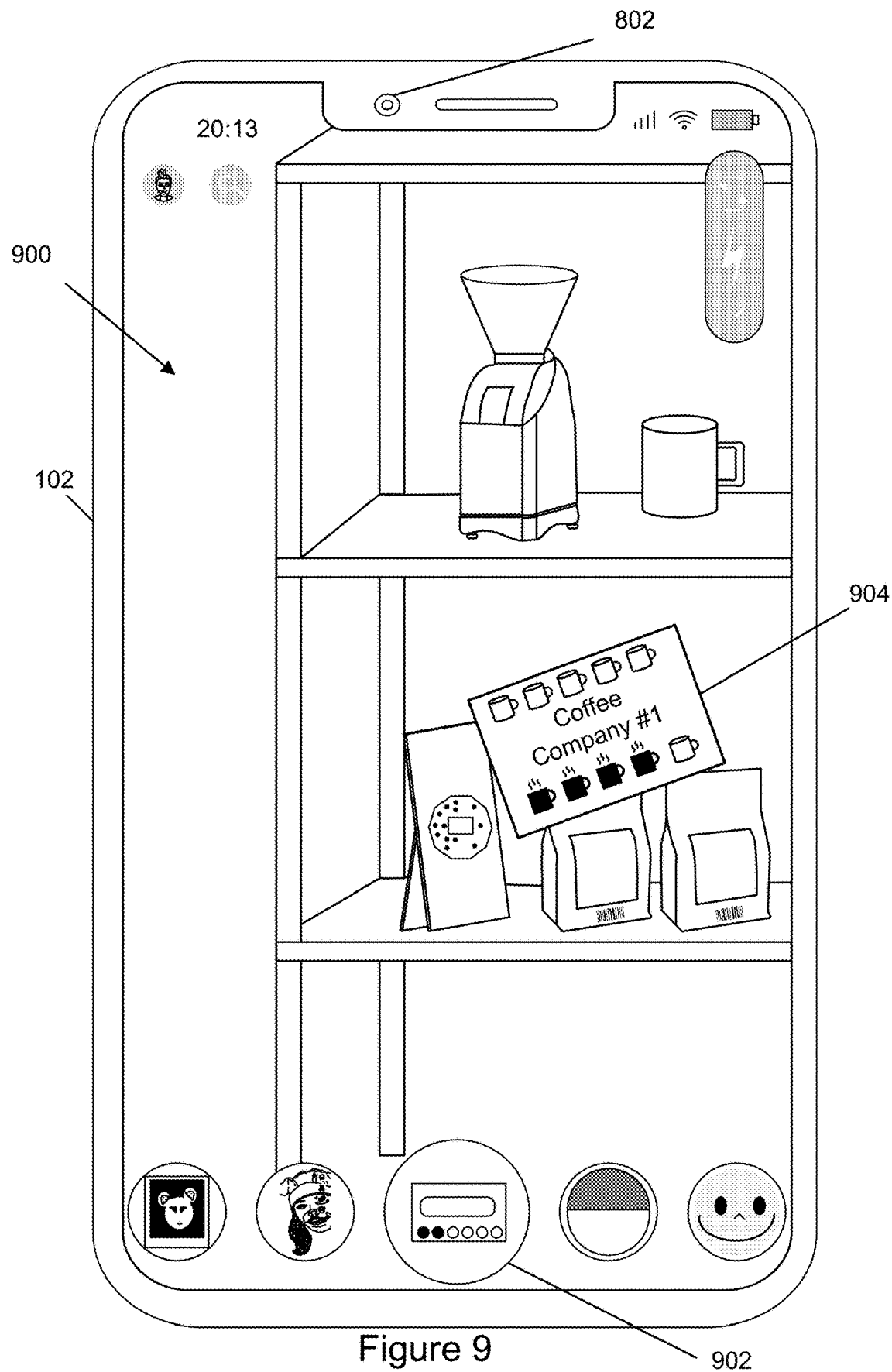
FIG. 9 is an illustration of a user interface that includes augmented reality content indicating activity of a user of a client application in relation to a promotion, according to one or more example implementations.

FIG. 9 is an illustration of a user interface 900 that includes an augmented reality content item indicating activity of a user of a client application in relation to a promotion, according to one or more example implementations. The user interface 900 may be displayed via a display device of the client device 102. In addition, the user interface 900 may be displayed by a client application, such as the client application 104, that includes at least one of messaging functionality or social networking functionality. In one or more examples, the user interface 900 may be displayed after scanning a portion of the user content shown in the user interface 900, such as the scanning operation described with respect to FIG. 8.

The user interface 900 may include a user interface element 902 that is selectable to execute one or more augmented reality content items that produce at least one of video content, image content, or audio content indicating an amount of user activity with respect to a promotion offered to users of the client application 104. In the illustrative example of FIG. 9, selection of the user interface element 902 may cause the content 904 to be displayed. The content 904 may indicate a number of visits to the location shown in FIG. 9. In one or more additional examples, the content 904 may indicate a number of products purchased by a user of the client application 104 that are shown in the user interface 900. In various examples, the content 904 may include a punch card that indicates an amount of user activity with respect to a threshold amount of user activity. Although not shown in the illustrative example of FIG. 9, the user interface 900 may also include one or more user interface elements that are selectable to redeem at least a portion of the promotion related to at least one of the location or products shown in the user interface 900.

Figure 10:
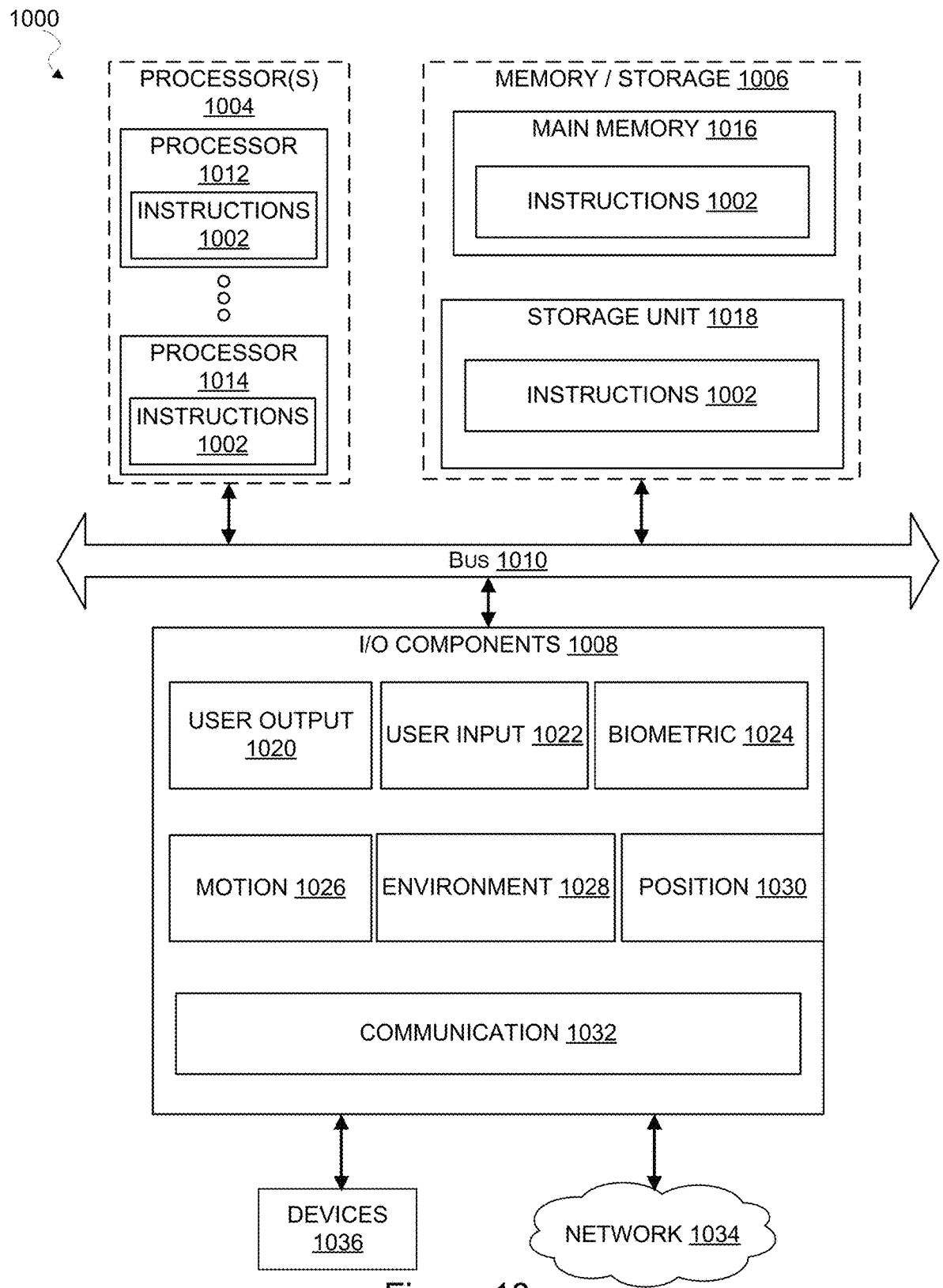
FIG. 10 is a block diagram illustrating components of a machine, in the form of a computer system, that may read and execute instructions from one or more machine-readable media to perform any one or more methodologies described herein, in accordance with one or more example implementations.

FIG. 10 is a block diagram illustrating components of a machine 1000, according to some example implementations, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1002 (e.g., software, a program, an application, an applet, an app, or other executable code) for causing the machine 1000 to perform any one or more of the methodologies discussed herein may be executed. As such, the instructions 1002 may be used to implement modules or components described herein. The instructions 1002 transform the general, non-programmed machine 1000 into a particular machine 1000 programmed to carry out the described and illustrated functions in the manner described. In alternative implementations, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by machine 1000. Further, while only a single machine 1000 is illustrated, the term "machine" shall also be taken to include a collection of machines that individually or jointly execute the instructions 1002 to perform any one or more of the methodologies discussed herein.

The machine 1000 may include processors 1004, memory/storage 1006, and I/O components 1008, which may be configured to communicate with each other such as via a bus 1010. In an example implementation, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1002. The term "processor" is intended to include multi-core processors 1004 that may comprise two or more independent processors (sometimes referred to as "cores") that may execute instructions 1002 contemporaneously. Although FIG. 10 shows multiple processors 1004, the machine 1000 may include a single processor 1012 with a single core, a single processor 1012 with multiple cores (e.g., a multi-core processor), multiple processors 1012, 1014 with a single core, multiple processors 1012, 1014 with multiple cores, or any combination thereof.

The memory/storage 1006 may include memory, such as a main memory 1016, or other memory storage, and a storage unit 1018, both accessible to the processors 1004 such as via the bus 1010. The storage unit 1018 and main memory 1016 store the instructions 1002 embodying any one or more of the methodologies or functions described herein. The instructions 1002 may also reside, completely or partially, within the main memory 1016, within the storage unit 1018, within at least one of the processors 1004 (e.g., within the processor's cache memory), or any suitable combination thereof, during execution thereof by the machine 1000. Accordingly, the main memory 1016, the storage unit 1018, and the memory of processors 1004 are examples of machine-readable media.

The I/O components 1008 may include a wide variety of components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example implementations, the I/O components 1008 may include user output components 1020 and user input components 1022. The user output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1008 may include biometric components 1024, motion components 1026, environmental components 1028, or position components 1030 among a wide array of other components. For example, the biometric components 1024 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1026 may include acceleration sensor components (e.g., accelerometer), gravitation sensor components, rotation sensor components (e.g., gyroscope), and so forth. The environmental components 1028 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1030 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 may include communication components 1032 operable to couple the machine 1000 to a network 1034 or devices 1036. For example, the communication components 1032 may include a network interface component or other suitable device to interface with the network 1034. In further examples, communication components 1032 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1036 may be another machine 1000 or any of a wide variety of peripheral devices (e.g., a peripheral device coupled via a USB).

Moreover, the communication components 1032 may detect identifiers or include components operable to detect identifiers. For example, the communication components 1032 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1032, such as location via Internet Protocol (IP) geo-location, location via Wi-Fi® signal triangulation, location via detecting an NFC beacon signal that may indicate a particular location, and so forth.

Figure 11:
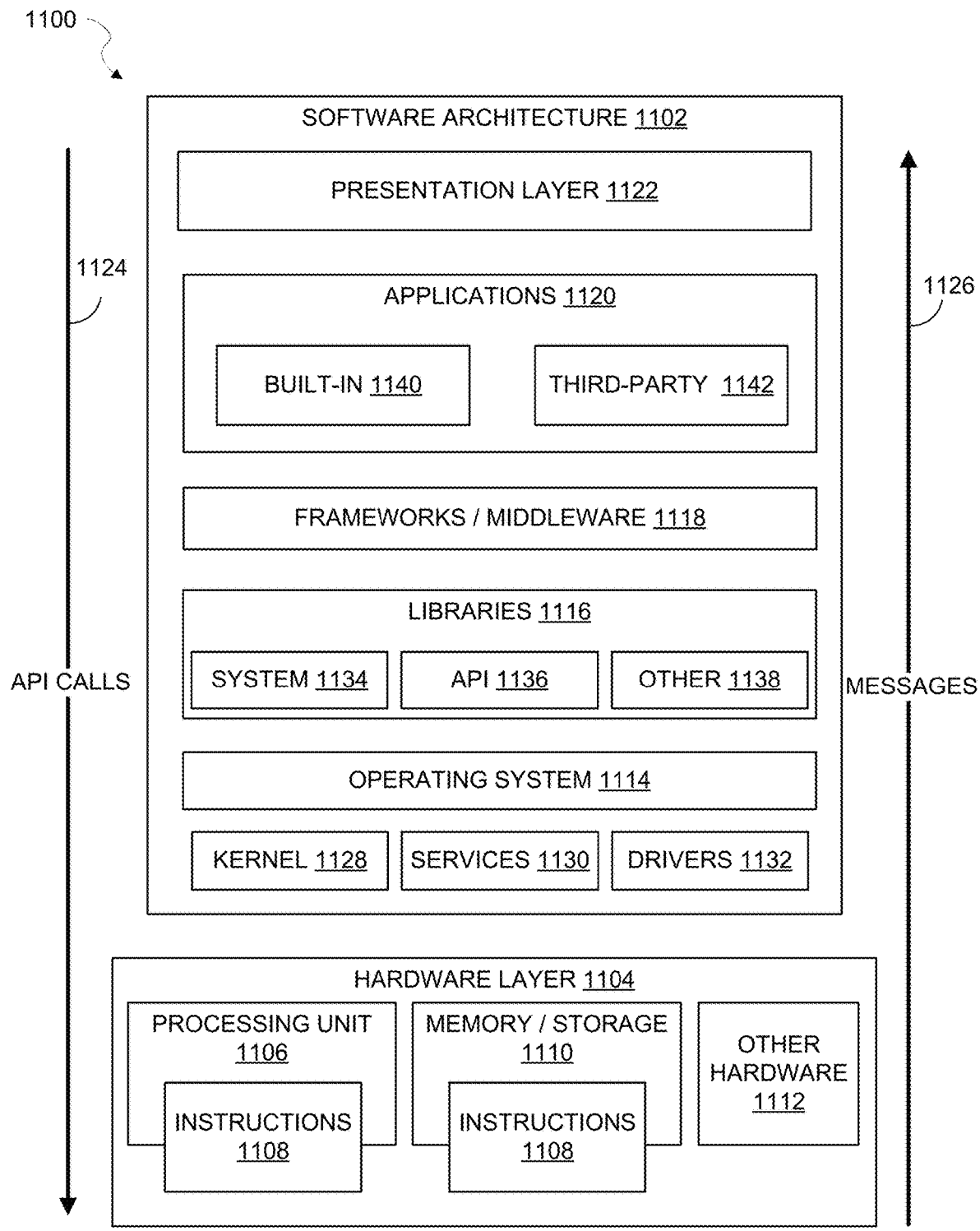
FIG. 11 is block diagram illustrating a representative software architecture that may be used in conjunction with one or more hardware architectures described herein, in accordance with one or more example implementations.

FIG. 11 is a block diagram illustrating system 1100 that includes an example software architecture 1102, which may be used in conjunction with various hardware architectures herein described. FIG. 11 is a non-limiting example of a software architecture and it will be appreciated that many other architectures may be implemented to facilitate the functionality described herein. The software architecture 1102 may execute on hardware such as machine 1000 of FIG. 10 that includes, among other things, processors 1004, memory/storage 1006, and input/output (I/O) components 1008. A representative hardware layer 1104 is illustrated and can represent, for example, the machine 1000 of FIG. 10. The representative hardware layer 1104 includes a processing unit 1106 having associated executable instructions 1108. Executable instructions 1108 represent the executable instructions of the software architecture 1102, including implementation of the methods, components, and so forth described herein. The hardware layer 1104 also includes at least one of memory or storage modules memory/storage 1110, which also have executable instructions 1108. The hardware layer 1104 may also comprise other hardware 1112.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1122. Operationally, the applications 1120 or other components within the layers may invoke API calls 1124 through the software stack and receive messages 1126 in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 are responsible for controlling or interfacing with the underlying hardware. For instance, the drivers 1132 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 provide a common infrastructure that is used by at least one of the applications 1120, other components, or layers. The libraries 1116 provide functionality that allows other software components to perform tasks in an easier fashion than to interface directly with the underlying operating system 1114 functionality (e.g., kernel 1128, services 1130, drivers 1132). The libraries 1116 may include system libraries 1134 (e.g., C standard library) that may provide functions such as memory allocation functions, string manipulation functions, mathematical functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) provide a higher-level common infrastructure that may be used by the applications 1120 or other software components/modules. For example, the frameworks/middleware 1118 may provide various graphical user interface functions, high-level resource management, high-level location services, and so forth. The frameworks/middleware 1118 may provide a broad spectrum of other APIs that may be utilized by the applications 1120 or other software components/modules, some of which may be specific to a particular operating system 1114 or platform.

The applications 1120 include built-in applications 1140 and third-party applications 1142. Examples of representative built-in applications 1140 may include, but are not limited to, a contacts application, a browser application, a book reader application, a location application, a media application, a messaging application, or a game application. Third-party applications 1142 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1142 may invoke the API calls 1124 provided by the mobile operating system (such as operating system 1114) to facilitate functionality described herein.

The applications 1120 may use built-in operating system functions (e.g., kernel 1128, services 1130, drivers 1132), libraries 1116, and frameworks/middleware 1118 to create UIs to interact with users of the system. Alternatively, or additionally, in some systems, interactions with a user may occur through a presentation layer, such as presentation layer 1122. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1002 for execution by the machine 1000, and includes digital or analog communications signals or other intangible medium to facilitate communication of such instructions 1002. Instructions 1002 may be transmitted or received over the network 110, 1034 using a transitory or non-transitory transmission medium via a network interface device and using any one of a number of well-known transfer protocols.

"CLIENT DEVICE," in this context, refers to any machine 1000 that interfaces to a communications network 110, 1034 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1034.

"COMMUNICATIONS NETWORK," in this context, refers to one or more portions of a network 110, 1034 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 1034 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1002 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions 1002 (e.g., code) for execution by a machine 1000, such that the instructions 1002, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor 1012, 1014 or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor 1012, 1014 or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 110 (e.g., the Internet) and via one or more appropriate interfaces (e.g., an API). The performance of certain of the operations may be distributed among the processors, not only residing within a single machine 1000, but deployed across a number of machines. In some example implementations, the processors 1004 or processor-implemented components may be located in a single geographic location (e.g., within a home environment, an office environment, or a server farm). In other example implementations, the processors 1004 or processor-implemented components may be distributed across a number of geographic locations.

"PROCESSOR," in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a CPU, a RISC processor, a CISC processor, a GPU, a DSP, an ASIC, a RFIC or any combination thereof. A processor 1004 may further be a multi-core processor having two or more independent processors 1004 (sometimes referred to as "cores") that may execute instructions 1002 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A device comprising:
   a camera;
   one or more processors; and
   memory storing computer-readable instructions that, when executed by the one or more processors, cause the one or more processors to perform operations comprising:
   instructing the camera to capture a live view of user content using one or more input devices of a client device of a user of a client application;
   causing a first user interface to be displayed that includes the live view of the user content and a first user interface element that is selectable to scan at least a portion of the live view of the user content;

responsive to selection of the first user interface element, causing a second user interface to be displayed that includes the live view of the user content and a second user interface element that is selectable to cause an augmented reality content item corresponding to the second user interface element to be executed;

determining selection of the second user interface element; and responsive to selection of the second user interface element, executing one or more functions of the augmented reality content item corresponding to the second user interface element to cause display of a third user interface, the third user interface including at least one of image content or video content indicating an amount of user activity related to a promotion offered to users of the client application and indicating an additional amount of the user activity before a redemption option of the promotion is triggered.

2. The device of claim 1, wherein the memory stores additional computer-readable instructions that, when executed by the one or more processors, cause the one or more processors to perform additional operations comprising:

responsive to selection of the second user interface element, generating scanned data that corresponds to portion of the user content; and sending the scanned data to a server system of a service provider that administers the client application.

3. The device of claim 1, wherein the augmented reality content item is executable to display at least one of additional image content or additional video content including one or more options to redeem the promotion with respect to the user of the client application.

4. The device of claim 3, wherein the memory stores additional computer-readable instructions that, when executed by the one or more processors, cause the one or more processors to perform additional operations comprising:

determining selection of an option of the one or more options to redeem the promotion; and receiving a redemption code in response to selection of the option.

5. The device of claim 4, wherein the memory stores additional computer-readable instructions that, when executed by the one or more processors, cause the one or more processors to perform additional operations comprising:

generating financial transaction information that is applicable to one or more purchases of a product related to the promotion using the redemption code.

6. The device of claim 3, wherein the at least one of the additional image content or the additional video content is displayed as an overlay of the live view of the user content.

7. The device of claim 1, wherein:

the second user interface includes a plurality of user interface elements arranged in a carousel that is selectable to scroll through a set of user interface elements that correspond to individual augmented reality content items; and the set of user interface elements includes the second user interface element.

8. The device of claim 1, wherein:

the user activity corresponds to a visit to a location that corresponds to the live view of the user content.

9. One or more non-transitory computer-readable media storing computer-readable instructions that, when executed by one or more hardware processors, cause the one or more hardware processors to perform operations comprising:

instructing a camera of a computing device to capture a live view of user content using one or more input devices of the computing device of a user of a client application;

causing a first user interface to be displayed that includes the live view of the user content and a first user interface element that is selectable to scan at least a portion of the live view of the user content;

responsive to selection of the first user interface element, causing a second user interface to be displayed that includes the live view of the user content and a second user interface element that is selectable to cause an augmented reality content item corresponding to the second user interface element to be executed;

determining selection of the second user interface element; and responsive to selection of the second user interface element, executing one or more functions of the augmented reality content item corresponding to the second user interface element to cause display of a third user interface, the third user interface including at least one of image content or video content indicating an amount of user activity related to a promotion offered to users of the client application and indicating an additional amount of the user activity before a redemption option of the promotion is triggered.

10. The one or more non-transitory computer-readable media of claim 9, including additional computer-readable instructions that, when executed by one or more hardware processors, cause the one or more hardware processors to perform additional operations comprising:

causing the at least one of the image content or the video content indicating the amount of user activity to be displayed as an animation that overlays the live view of the user content.

11. The one or more non-transitory computer-readable media of claim 9, including additional computer-readable instructions that, when executed by one or more hardware processors, cause the one or more hardware processors to perform additional operations comprising:

causing one or more user interface elements to be displayed in at least one of the third user interface or in a fourth user interface, individual user interface elements of the one or more user interface elements corresponding to an option to redeem at least a portion of the user activity with respect to the promotion.

12. The one or more non-transitory computer-readable media of claim 11, including additional computer-readable instructions that, when executed by one or more hardware processors, cause the one or more hardware processors to perform additional operations comprising:

determining selection of a user interface element of the one or more user interface elements that corresponds to an option to redeem the promotion; and receiving a redemption code in response to selection of the option.

13. The one or more non-transitory computer-readable media of claim 9, including additional computer-readable instructions that, when executed by one or more hardware processors, cause the one or more hardware processors to perform additional operations comprising:

receiving an offer to participate in the promotion from a service provider that administers the client application; and providing an indication to participate in the promotion to the service provider.

14. The one or more non-transitory computer-readable media of claim 9, wherein the promotion includes a first threshold level of activity that corresponds to a first reward and a second threshold level of user activity that corresponds to a second reward.

15. One or more non-transitory computer-readable media storing computer-readable instructions that, when executed by one or more hardware processors, cause the one or more hardware processors to perform operations comprising:
receiving user content from a client device, the client device corresponding to a user of a client application and the user content including at least one of image content or video content;
analyzing the user content to determine a user activity corresponding to the user content;
determining that the user activity corresponds to a promotion offered to users of the client application;
modifying profile data of the user of the client application with respect to the promotion from a first amount of the user activity to a second amount of the user activity;
receiving an indication that a user interface element has been selected from among a number of user interface elements displayed in a user interface that includes a live view of the user content, the user interface element corresponding to an augmented reality content item that is executable to make promotional content accessible to users of the client application; and
responsive to selection of the user interface element, causing execution of one or more functions of the augmented reality content item within the client application to generate an overlay of the live view of the user content, the overlay indicating the second amount of user activity with respect to the promotion.

16. The one or more non-transitory computer-readable media of claim 15, including additional computer-readable instructions that, when executed by one or more hardware processors, cause the one or more hardware processors to perform additional operations comprising:
responsive to determining that the user activity corresponds to the promotion, analyzing profile information of the user to determine that the user is participating in the promotion.

17. The one or more non-transitory computer-readable media of claim 15, including additional computer-readable instructions that, when executed by one or more hardware processors, cause the one or more hardware processors to perform additional operations comprising:
determining that the second amount of user activity corresponds to a threshold amount of user activity with respect to the promotion; and
determining one or more redemption options for the promotion with respect to the user based on the second amount of user activity corresponding to the threshold amount of user activity;
wherein the augmented reality content item is executable to display the one or more redemption options in conjunction with an indicator of the second amount of user activity.

18. The one or more non-transitory computer-readable media of claim 15, including additional computer-readable instructions that, when executed by one or more hardware processors, cause the one or more hardware processors to perform additional operations comprising:
generating first user interface data corresponding to a first user interface that includes a first set of user interface elements that includes a first user interface element that is selectable to scan the user content; and
responsive to determining that the user activity corresponds to the promotion, generating second user interface data corresponding to a second user interface that includes a second set of user interface elements that is different from the first set of user interface elements, the second set of user interface elements including the user interface element that is selectable to execute the one or more functions of the augmented reality content item; and
wherein an individual user interface element of the second set of user interface elements is selectable to execute one or more functions of a respective augmented reality content item that modifies the user content in a manner that is different from additional augmented reality content items that correspond to additional second user interface elements of the second set of user interface elements.

19. The one or more non-transitory computer-readable media of claim 15, wherein the user activity corresponds to a purchase of a product; and
the one or more non-transitory computer-readable media including additional computer-readable instructions that, when executed by one or more hardware processors, cause the one or more hardware processors to perform additional operations comprising:
analyzing profile data of the user to determine a number of purchases of the product by the user; determining that the number of purchases of the product by the user is at least a threshold number of purchases, the threshold number of purchases corresponding to a number of purchases of the product that triggers a redemption option of the promotion; and
making the redemption option available to the user based on the number of purchases of the product by the user being at least the threshold number of purchases.

20. The one or more non-transitory computer-readable media of claim 15, including additional computer-readable instructions that, when executed by one or more hardware processors, cause the one or more hardware processors to perform additional operations comprising:
determining, using one or more object recognition techniques, at least one of one or more objects, one or more shapes, one or more contours, or one or more colors of the user content;
performing an analysis of the at least one of the one or more objects, the one or more shapes, the one or more contours, or the one or more colors with respect to at least one of image content or video content of a plurality of locations;
determining, based on the analysis, that the user content corresponds to a location of the plurality of locations;
analyzing profile data of the user to determine a number of visits to the location by the user;
determining that the number of visits to the location by the user is at least a threshold number of visits, the threshold number of visits corresponding to a number of visits to the location that triggers a redemption option of the promotion; and
making the redemption option available to the user based on the number of visits to the location by the user being at least the threshold number of visits.

* * * * *